(12) United States Patent
Strazza

(10) Patent No.: US 6,466,983 B1
(45) Date of Patent: Oct. 15, 2002

(54) SYSTEMS AND METHODS FOR CONTROLLING ACCESS TO DATA MAINTAINED IN A REPOSITORY

(75) Inventor: Steven Paul Strazza, 16117 Asa Dr., Spencerville, MD (US) 20868-9736

(73) Assignee: Steven Paul Strazza, Spencerville, MD (US)

( * ) Notice: Subject to any disclaimer, the term of this patent is extended or adjusted under 35 U.S.C. 154(b) by 0 days.

(21) Appl. No.: 09/406,196

(22) Filed: Sep. 30, 1999

(51) Int. Cl.[7] .............................................. G06F 15/16
(52) U.S. Cl. ...................... 709/227; 709/203; 709/201; 709/219; 709/226; 709/229; 707/522; 707/8; 707/515; 707/200; 707/102
(58) Field of Search ................................ 709/101, 102, 709/104, 201, 202, 203, 213, 215, 217, 219; 713/201, 202, 227; 707/8, 102, 200, 515, 522

(56) References Cited

U.S. PATENT DOCUMENTS

| | | | |
|---|---|---|---|
| 5,675,802 A | * | 10/1997 | Allen et al. |
| 5,751,997 A | * | 5/1998 | Kullick et al. |
| 5,850,490 A | * | 12/1998 | Johnson |
| 6,009,442 A | * | 12/1999 | Chen et al. |
| 6,088,728 A | * | 7/2000 | Bellemore et al. |
| 6,237,011 B1 | * | 5/2001 | Ferguson et al. |
| 6,243,751 B1 | * | 6/2001 | Chatterjee et al. |
| 6,260,069 B1 | * | 7/2001 | Anglin |
| 6,269,380 B1 | * | 7/2001 | Terry et al. |
| 6,308,179 B1 | * | 10/2001 | Peterson et al. |

OTHER PUBLICATIONS

Raggett, David; HTML 3.2 Reference Specification; Document REC–HTML32, Jan. 14, 1997, HTTP://www.w3.Org/TR/Rec–HTML32.

Gettys, J; Mogul, J, et al RFC2616 Hypertext Transfer Portocol HTTP/1.1;Jun. 1999, The Internet Society, www.w3.Org/Protocols.

* cited by examiner

*Primary Examiner*—Ayaz Sheikh
*Assistant Examiner*—Young N. Won
(74) *Attorney, Agent, or Firm*—Thomas M. Marshall, Esq.

(57) ABSTRACT

Systems and methods for controlling the dissemination of data from a repository based on request mechanisms that are transparent to the requestor and the connection conveying the requests. The systems and methods are used by the repository to enforce one or more rule sets that implement varying levels of access privilege created by the repository designer. For each user requesting access to privileged data, the repository uses the systems and methods to manage novel information structures whose purpose is to apply the rule sets to the requestor's session. By incorporating into each request, a set of values herein named a "forresta" and a "destination", the systems and methods exercise control over data access, assemblage and presentation. In addition, the systems and methods provide that clients require no enhancements to well-known methods or systems used to facilitate communications with repositories employing this invention.

25 Claims, 13 Drawing Sheets

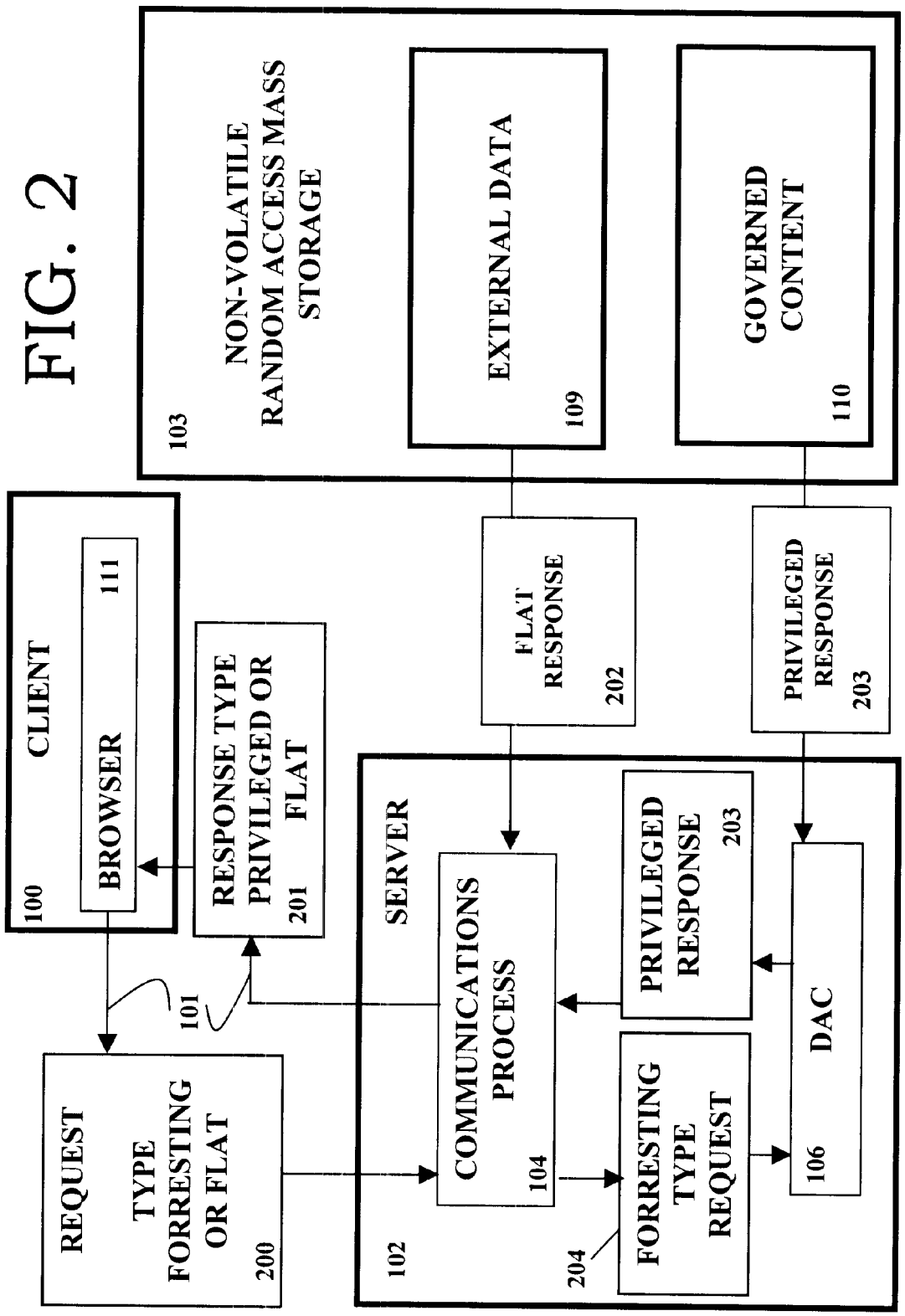

SYSTEMS AND METHODS FOR CONTROLLING ACCESS TO DATA MAINTAINED IN A REPOSITORY

CROSS-REFERENCE TO RELATED APPLICATIONS

U.S. patent application, Ser. No. 09/406,197 filed on the same date as this application by the same inventor.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

This invention relates to systems and methods for storing, controlling and monitoring of digital data retrieval and presentation, and more particularly to processing of digital data to facilitate such.

With the popularity and economic frugality of disseminating information over wide area or local area networks ("WANALAN") continually expanding, designers of data repositories existing on such networks have employed various techniques to control access by their clients or users to the content provided in such repositories. In many instances, prior art content access by any particular client is an all-or-nothing affair. If a client submits the correct credentials or originates the connection from a specific locale, the repository will provide whatever content is available. If the client fails to identify him or herself properly, the repository denies all content. In the nothing response, the presenter loses the ability to display any content, potentially losing a client. In the all response, the presenter is faced with costly and sometimes impractical solutions for determining precisely what sensitive content was accessed, downloaded or viewed and by whom. For those repository applications that do qualify content after user validation, most request additional forms of identification, generally another all-or-nothing approach applied to a sub-set of the data or, they contain client/server cooperation dependencies in order to implement security. In some cases, additional hardware or physical discontinuity is employed to regulate content retrieval but this is highly restrictive and can be financially out of reach for some.

When such prior art repositories exist on networks that employ governmental or industrial data classifications, access infractions pose an even more serious threat to the well being of the community that relies on the integrity and exclusiveness of accessible data. In situations as these, multiple users may have sufficient authority to pass through access control but may lack the need to know such information although they are qualified from a permission standpoint, to view it. Environments that process extremely sensitive data are typically restricted to one repository with no external or shared access allowed. This is the outer fringe of content control requiring a major commitment from the presenter in order to be implemented.

To illustrate some of the problems previous prior art content control techniques have encountered; a cursory look at some of the better-known methods is required. The first of these, well-known as a "cookie approach", requires the client to accept a data structure commonly referred to as a "cookie" from the repository and further, not modify or delete it once it has been accepted. The repository then requires the client to return the cookie for each request and based on some privilege value assigned to the cookie, permits content to be transmitted to the client. This method assumes that the client has the capacity to store the cookie, something not always possible with connections that do not possess non-volatile memory. Because the cookie is connection oriented rather than content oriented, it is difficult to control the access to specific items contained within the returned content.

The implementation of a prior art certificate process typically requires the participation of a third party to inspect and guarantee the certificate and data content issued by the repository. This type of control is for the benefit of the client in that it provides an assurance that the content originated from the repository. It provides little or no dissemination control from a repository standpoint, especially in open network environments such as the Internet.

Using a prior art re-direction method, the presenter instructs the user's access mechanism to form a connection with a repository that is different from the initial. Although this method addresses content control, the method is weak for several reasons. It assumes the presenter has another location to which the connection can be re-directed and once this location is known, protecting it becomes as much of an issue as protecting the original site. Similar to cookies, re-direction is a connection-oriented mechanism and not an item oriented one.

Another common, prior art approach is data censure. In this method, the data content is examined for specific occurrences of certain terms or values. If the examination process encounters a censured term or value within the response of the repository, the content is denied to the client. When repository designers incorporate censure methods into content control schemes, problems multiply rather subside. Issues arise as to what standard should be applied for measuring the level of censure as well as how to regulate and administer those that apply the measures. In some cases, filtered material that should be available is excluded solely because it leads to irrelevant or unauthorized repositories. Censure may also have the undesired side effect of preventing proper data synchronization. Specifically, data that is censured may age or update at a rate different from that of its parent source. Lastly, censure methods are not discrete. By not discrete it is meant that prohibited values may innocuously occur in perfectly valid content; however, because the censure mechanism cannot distinguish the semantic difference, the content would be denied due to the physical presence of the prohibited data.

What all of these previous prior art techniques share is the attribute that regulated content is assembled into a fixed form prior to its availability. This restriction requires multiple forms of the same content, with alterations to each construct made based on the level of sensitivity. This leads to the duplication of many elements used to implement the content since no mechanism exists to dynamically replace only the sensitive portions at the time of the request. With duplication, there are increased cost and service requirements.

It should be noted that other prior art access control techniques such as secure sockets, encryption, firewalls and proxy servers fall into separate categories distinct from those methods described above. Secure sockets and encryption are well-known methods that protect content during transmission while firewalls and proxy servers are well-known methods that limit direct connections with the repository.

In a protected transmission, anyone may view the connection but will lack the capacity to decipher the content. The issue then becomes controlling what content is exchanged to a privileged client rather than how it is protected during the exchange. Since encryption applies to the overall session, determining the accessibility of specific content typically requires an additional system. Again, the presenter is challenged by the same dilemma as before only now, all-or-nothing is presented over a secure channel.

By using prior art firewalls and proxy servers as software-based gateways, the repository itself is protected from unauthorized access but the ability of these technologies to selectively assign content to authorized users is relatively nil or non-existent.

All of the present prior art access control schemes for data on a repository fail to provide a simple, effective means to dynamically assign and assemble responses to users of no, equal, or disparate privilege at the time of the request.

BRIEF SUMMARY OF THE INVENTION

Systems and methods are described for controlling the access, assemblage and presentation or transmission of data maintained in a computer system repository. The present invention has particular application to computer based servers that store or maintain data having varying permission, security or sensitivity requirements and which servers provide access to such data to a plurality of clients.

The present invention overcomes the deficiencies of prior schemes for controlling content dissemination by allowing the repository to dynamically construct responses. This is attained by including passive information, herein labeled as a "forresta", within the user's request. Using the functionality provided by the forresta, each of the client requests and each of the server responses are individualized. This individualization prevents a client from obtaining a response requiring an authority level not held by the requestor or is intended for another.

This invention implements two information structures within a computer system. These structures are denoted herein as a "session node" and a "build code sequence". A unique session node exists at the repository for each client requesting controlled content and in conjunction with the forresta, implements the determination of applicability of content to a client. Construction of content appropriate for a particular client is achieved using one or more build code sequences, whose selection is dynamic and can vary with each client request.

BRIEF DESCRIPTION OF THE SEVERAL VIEWS OF THE DRAWING

FIG. 2 is a block diagram depicting the request/response relationship established for a client with the repository.

DETAILED DESCRIPTION OF THE INVENTION

In the following detailed description of the systems and methods of the present invention, numerous specific details of an exemplary embodiment are set forth in order to provide a thorough understanding of the systems and methods of the present invention. It will be obvious to those skilled in the art to which this invention pertains that the present invention may be practiced without these specific details. In other instances well-known methods, procedures, components and circuits have not been described in detail to avoid unnecessarily obscuring aspects of the present invention.

Figure 1:
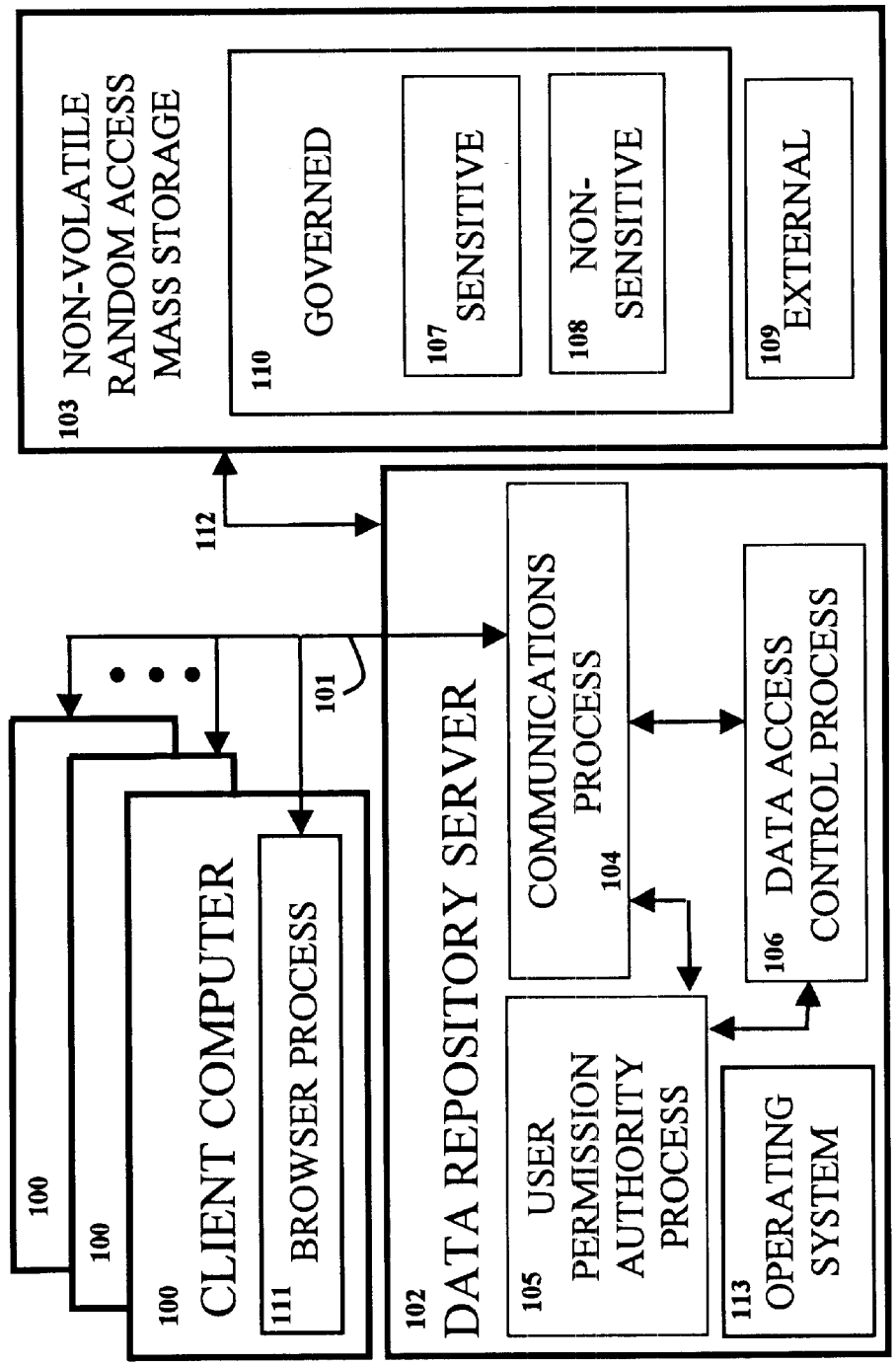
FIG. 1 is a block diagram. illustrating an exemplary environment used by the present invention. The relationships between the client, the repository and the content are shown.

FIG. 1 is a simplified diagram of an exemplary system embodying this invention. As shown in FIG. 1, the system includes at least one or a plurality of requestors that are represented in the diagram by a user's client computer 100. A client computer 100 is operated by a user and the terms: "client", "user", and "requestor" are used interchangeably herein with equivalent meaning. A data repository server computer 102 with non-volatile random access storage 103 is used in implementing the data repository with which each client computer 100 will exchange data. The server computer 102 connects with each client 100 in the system using some form of a communications link 101, typically implemented using a network. The server computer 102 connects with the random access storage 103 using some form of a communications link 112, typically implemented using a dedicated wiring arrangement. However, data transfer over a network communications link is also possible. The server computer 102 contains a prior art process that acts as the operating system 113, a prior art communication process 104 for receiving and transmitting data over the communications link 101, a prior art process 105 for authenticating each user 100 and defining their authority level; and, the data access control ("DAC") process 106 of the present invention.

The random access storage 103 may be composed of one or more physical units remotely placed or co-located with the server 102. The storage device 103 is occupied by sensitive data 107, non-sensitive data 108 and external data 109. As a whole, data maintained on the storage device 103 is generically referred to as "content". Sensitive 107 and non-sensitive data 108 whose creation, retrieval, modification or deletion is controlled by the method and process of the present invention is collectively referred to as "governed content" 110. Sensitive data 107 requires the client 100 to have an authority level issued by the user permission authority authentication process 105 in order to receive it while non-sensitive data 108 does not. External data 109 is all other data present on the storage device 103 that is not governed content 110.

With respect to FIG. 2, clients 100 (FIG. 1) may make one or more requests 200 of the server to have information or data content returned to them. Responses 201 returned to a client 100 when any parts of which are governed 110 is termed a "privileged response" 203. A response 201 containing only external data 109 is termed a "flat response" 202. In this embodiment of the present invention, both privileged 203 and flat 202 responses are computer data files structured using the Hypertext Markup Language ("HTML") format. HTML is a well-known computer programming language that allows a computer to process and render data received from another computer. The HTML coding as used by the embodiment of the present invention may reference data represented using other well-known or prior art formats including those that represent visual, textual, audible or programming information.

In this embodiment of the present invention, the client 100 (FIG. 1.) uses the prior art process commonly referred to as a "browser" 111 to transmit requests 200 (FIG. 2.) and receive responses 201 across the link 101. Browser communication employs a prior art process that is also represented within communication process 104 that facilitates client/server communication using the Hypertext Transfer Protocol ("HTTP"), a well-known method of transmitting digital information. A client request 200 that is sent in this manner is assumed to be in one of the well-known representations of a Uniform Resource Locator ("URL"). The URL is an adopted standard naming convention, which encompasses several sub-classes of location names presently including HTTP. Once a client 100 has established HTTP protocol communications with the server 102, requests 200 may alternatively be expressed as hyperlink references as allowed by the syntax of HTML.

With the receipt of a request 200 (FIG. 2) by communication process 104 (FIG. 1), the authority process 105, through its own method, may immediately require verification of the client's 100 right to communicate with the server 102. This action can occur independently of the method of the present invention. The method of the authority process 105 can also defer user verification until a later time. Instances of the authority process 105 interacting with the DAC 106 of the present invention are described later.

In general, the interpretation of a request 200 (FIG. 2) by the communications process 104 (FIG. 1) determines the receiving process resident on the server 102. This is the means by which the DAC 106 is notified when a request 200 destined for it arrives at the server 102. The t communications process 104 uniquely identifies each request 200 with its client 100 either by explicit value or by thread of process operation and forwards any associated argument list as input arguments to the DAC 106.

When the request 200 (FIG. 2) does not specify the DAC 106 (FIG. 1) as the intended recipient, it is denoted as being "flat". A response 202 to a flat request 200 is created by either IS communications process 104 or another prior art procedure. A flat type request 200 always receives external data 109 as the content of a response 201 from a repository server 102 that maintains governed content 110. A request 200 (FIG. 2) that is directed to the DAC 106 is denoted herein as a "forresting type" request 204. To retrieve governed content 110 the client 100 must at some point, make a flat type request 200 for content that contains at least one forresting type request 204 that the client 100 may subsequently invoke. A forresting type request 204 must be executed before any governed content 110 can be delivered as a response 201.

The content of the first response 201 (FIG. 2) that contains a forresting type request 204 is denoted using the common term "default page". The location of the default page on the storage device 103 (FIG. 1) is made known to the communications process 104 by the repository designer. This allows the default page to be retrieved and transmitted to the client 100 by the communication process 104 without executing any portion of the DAC 106. This means that the default page is always considered a flat type response 202 derived from external data 109. The retrieval and transmission of the default page is a well-known, common operation for communications processes 104 that implement HTTP and provide support for data represented using CML.

Figure 2A:
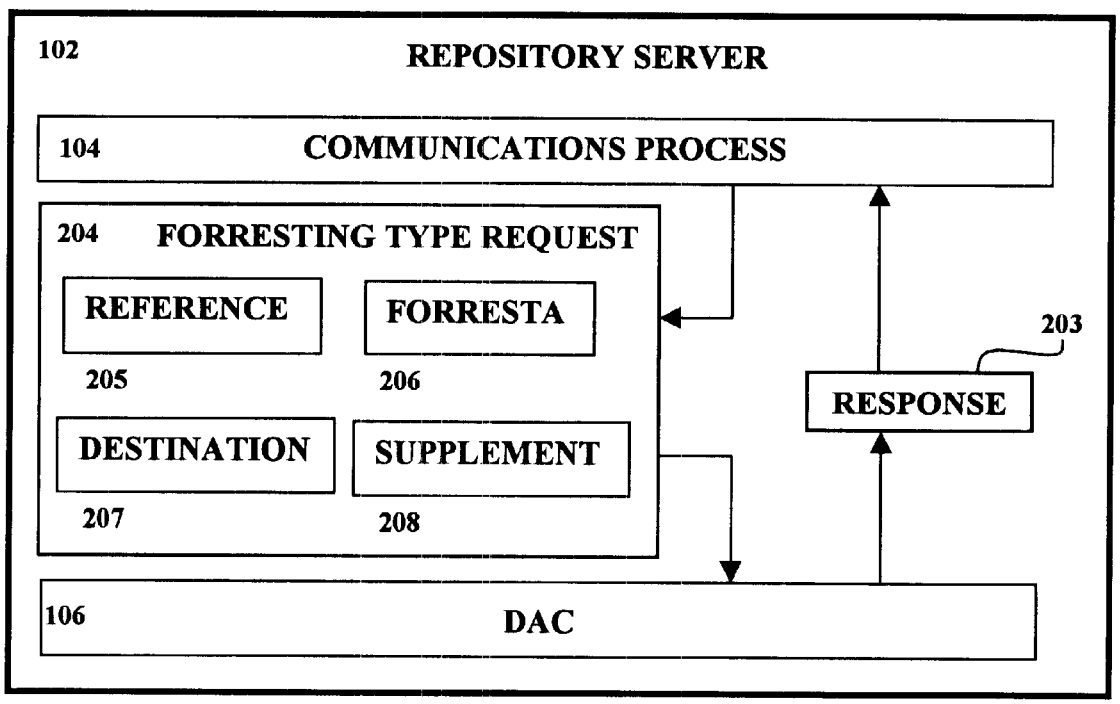
FIG. 2A is an exploded block diagram of elements from FIG. 2. It illustrates a greater level of detail for components of a forresting type request issued by a client.

A request 200 (FIG. 2) using the forresting format 204 includes at least two argument values in its representation. In this embodiment of the present invention, the actual representation of this request type conforms to the syntax rules for request specification as declared by the HTTP and HTML rules of implementation. With respect to FIG. 2, an expanded view of a request 200 in the forresting format 204 is depicted in FIG. 2A. The first field is denoted as the "reference field" 205. The value of the reference field 205 identifies the recipient of the request 204. The second field and first required argument 206 is referred to as the "forresta" and the third field and second required argument 207 is referred to as the "destination". The fourth field and optional argument 208 is any additional information not already described that is exchanged between the client 100 and the server 102. Accordingly, the forresta argument 206 contains the "forresta value" and the destination argument 207 contains the "destination value". Within the default page, each reference 205 in a forresting format request 204 has a forresta argument 206 set to an "anonymous user" value and a destination argument 207 whose value identifies non-sensitive content 108.

Use of the term "anonymous user" in this embodiment of the present invention should not be confused with the well-known concept of an "anonymous login", which is a general user account type established on a multi-user computer. As used herein, "anonymous" or "anonymous use?" is strictly defined as the DAC's 106 (FIG. 1) lack of authentication information for a particular client 100 as provided by the authority process 105. The explicit value of "anonymous user" is a constant that is global to all elements of the DAC 106 and in the preferred practice of the present invention is expressed as a form of numeric value zero.

Figure 3:
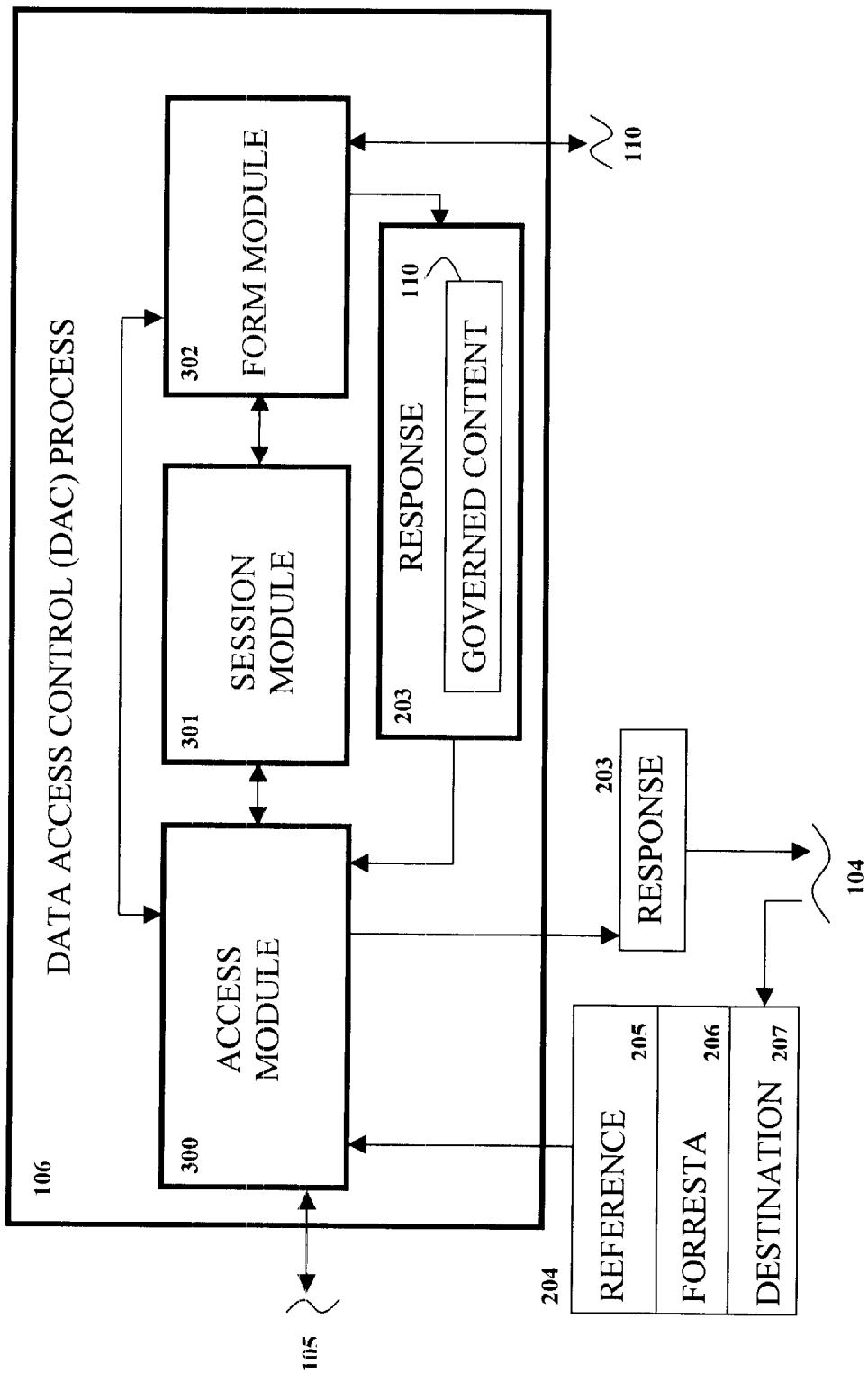
FIG. 3 is a block diagram of the major components of the Data Access Control ("DAC") process of the current invention. The input and output of a request and a response through this process is also shown.

With respect to FIG. 3, the DAC 106 (FIG. 1) of the present invention is further explained. The DAC 106 is sub-divided into three sub-processes. These sub-processes are the access module 300, the session module 301 and the form module 302. The access module 300 is always the recipient of a forresting type request 204 (FIG. 2). In this embodiment of the present invention, the identifier value of the access module 300 is used as the value of the reference 205. The access module 300 also contains the methods that implement interfacing to the communications 104 and user authentication 105 processes. The session module 301 maintains and processes information about each client 100 and the form module 302 generates privileged responses 203 (FIG. 2) from governed content 110. In the preferred practice of the present invention, a privileged response 203 containing governed content 110 is passed from form module 302 to access module 300 for delivery to the client 100 via communication process 104 and communication link 101.

The form module 302 (FIG. 3) constructs a response 203 (FIG. 2) to the client 100 (FIG. 1) based on the values of the forresta 206 (FIG. 2A) and destination 207 arguments. The destination argument 207 identifies the specific governed content 110 desired. The forresta argument 206 is used to determine the authority level of the request 204 and associates the request 204 with the specific client 100 that issued it.

Governed data 110 is organized as one or more instances of the general structure classification commonly known as a "file" as it pertains to non-volatile data storage on a computer. The present invention further qualifies these files as "fragments" to uniquely identify them from other files that may be co-located on the storage device 103. With respect to FIG. 4, an exemplary privileged type response 203 is shown as being composed of one or more fragments 401 arranged to form one or more pages 402.

The process and method of the present invention further qualifies fragments 401 (FIG. 4) into "types". These types are herein named: "body", "target", "frame" and "artwork". How a fragment 401 is categorized depends on the information content of the fragment 401. A "Body" type fragment contains data that is generally not modified by the method of the current invention. A "Target" type fragment contains one or more implied references 403 to other fragments 401. A "Frame" fragment contains information that when rendered or processed by the client computer 100 (FIG. 1), divides the viewing area of the display device at the client computer 100 into regions, each of which may receive governed 110 or external 109 content independent of the other regions. Lastly, an "Artwork" type fragment contains or has references to, visual, audio or other content not categorized by the other fragment types. In the event a fragment 401 contains attributes of multiple types, a hierarchy of categorization is applied in the following order listed from highest to lowest: frame, target, body and artwork.

Figure 4:
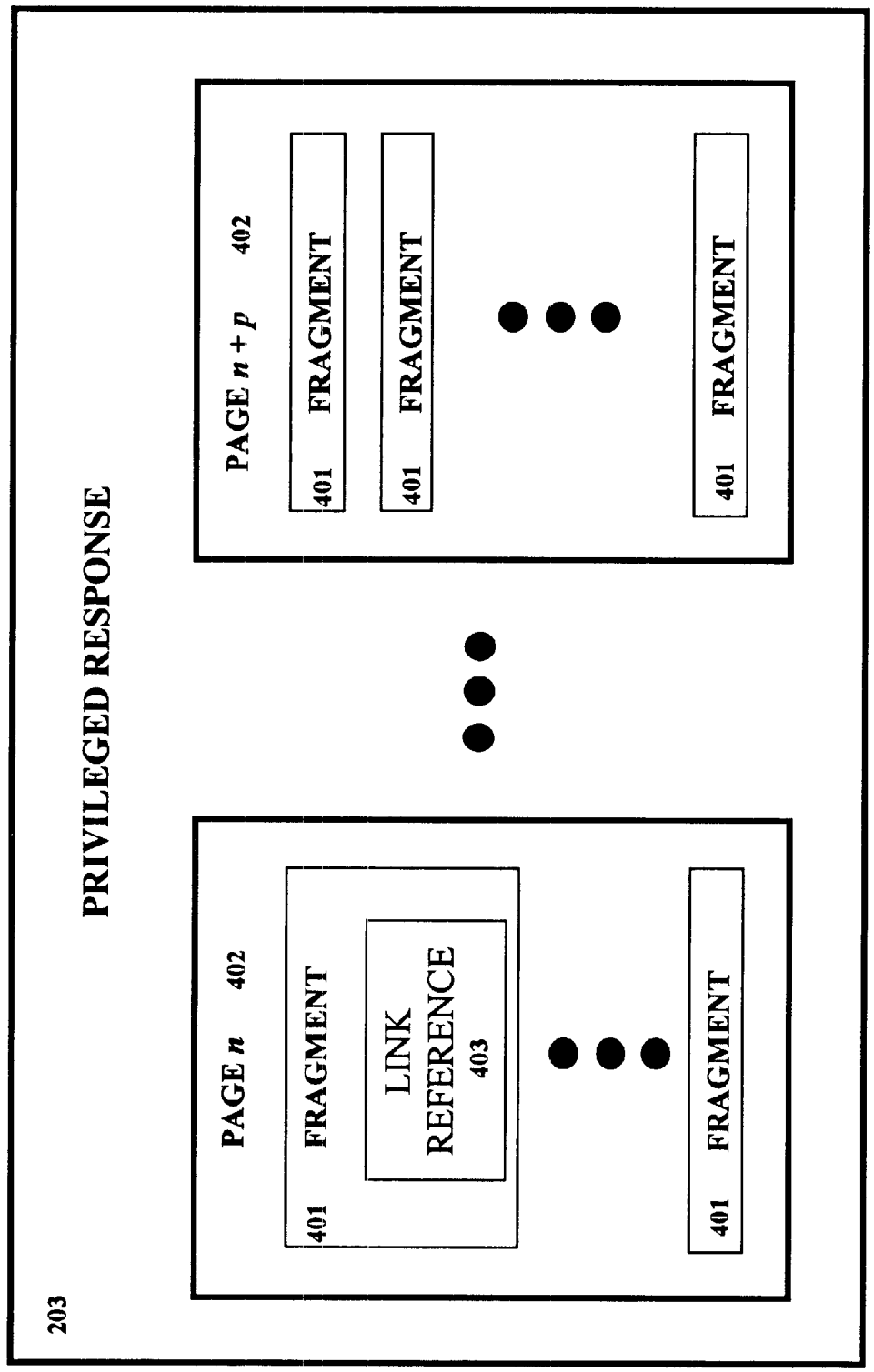
FIG. 4 is a block diagram illustrating the major components of a privileged response constructed by the method of the present invention.

Typically, one privileged response 203 (FIG. 2) is represented using one page 402 (FIG. 4). When the display device of the client 100 (FIG. 1) is sub-divided into multiple viewing areas, each such area can display content supplied by a unique page 402 meaning that a privileged response 203 would be composed of multiple pages. In this embodiment of the id present invention, each page 402 or set of pages is syntactically correct in its HTML form when delivered as a response 201.

Figure 5:
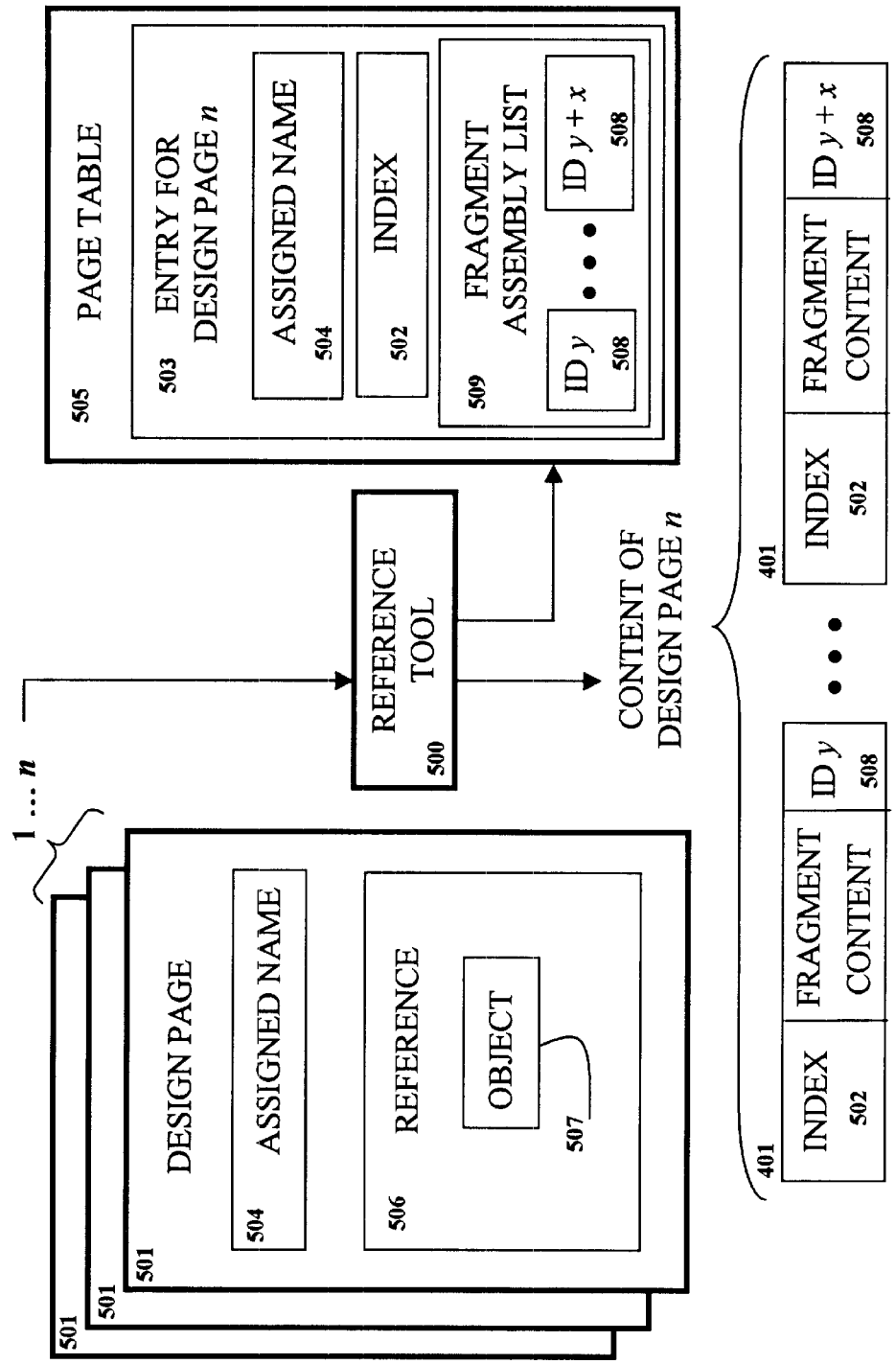
FIG. 5 is a block diagram depicting the structure of data as provided by the designer of the repository and its reorganization into a data structure used by the method and process of the current invention.

With respect to FIG. 5, the designer of the repository creates pages 402 (FIG. 4) by first delineating governed content 110 (FIG. 1) into one or more "design pages" 501. Content appearance, its design, layout, required authority and organization are attributes of design pages 501. These attributes are decided solely at the discretion of the repository designer and are developed using prior art processes that are independent of this embodiment of the current invention. The design page 501 to page 402 translation begins with the reference tool 500. The reference tool 500 is a process of the current invention that is executed by the designer as a standalone method. It is typically executed on a computer that is not the server 102 (FIG. 1) and always prior to governed content 110 being placed on the storage device 103.

The reference tool 500 (FIG. 5) begins by assigning each design page 501 a unique, integer identifier denoted as its "index" 502. A table 505, denoted as the "page table", is created by the reference tool 500 where each entry 503 represents a design page 501 by pairing its assigned name 504 and the tool generated index 502. As design pages 501 are processed, the reference tool 500 ensures that no two design pages 501 have the same assigned name 504 by comparing entries 503 made in the page table 505. If this situation occurs, the designer must correct it by altering the assigned name 504 of at least one of the design pages 501 in order to continue and complete the process. If a design page 501 contains a reference 506 to another design page 501, the assigned name 504 is used as the object 507 of the reference 506. There is no restriction on the identity of an object 507 if the object 507 does not identify a design page 501. In this instance, the reference tool 500 assumes that such an object 507 can be resolved when the request 201 (FIG. 2) of which it will be part, is processed by communications process 104 (FIG. 1).

The reference tool 500 (FIG. 5) continues by physically separating each design page 501 into one or more fragments 401 (FIG. 4). As they are created, fragments 401 are numbered uniquely with the value being placed denoted as a "fragment identifier" 508. The integer values used for identifying fragments 401 may be similar to the integer values used for identifying design pages 501 since by context a fragment identifier 508 can be distinguished from an index 502. The index identifier 502 of a design page 501 is additionally utilized as an attribute of the design page's 501 constituent fragments 401. This permits relating a fragment 401 back to the design page 501 from which it originated. Fragments 401 are numbered sequentially, preserving their placement order within the respective design page 501. Additionally, fragment numbering is assigned continuously across all design pages 501 rather than re-setting the identifier 508 to its original starting point with each new design page 501. As a design page 501 is processed by the reference tool 500, its entry 503 in the page table 505 is modified to record the fragment identifiers 508 in the requisite re-assembly order 509. This process repeats until all design pages 501 have been processed.

The reference tool 500 (FIG. 5) does not restrict the size or content of a fragment 401 (FIG. 4) and performs the mechanics of design page 501 break-up at the designer's direction. In this preferred embodiment of the practice of the current invention, the reference tool 500 ensures that a break-up of design page 501 content does not occur at a location that would split the syntax of a single HTML tag between two fragments 401. This rule is imposed for designer convenience and is not a reflection of a design limitation for the present invention. The criteria used for deciding design page 501 fragmentation are based upon the content of the design page 501. Sections of a design page 501 that require authority levels different from those required of other sections are typically broken out as fragments 401. However, the practice of the present invention is not dependent on the criteria employed to decide how fragmentation is applied to a design page 501. In accordance with this, it is possible to have an entire design page 501 be the content of a single fragment 401 that would then be the sole component of a page 402.

When all fragments 401 (FIG. 4) have been created, the reference tool 500 (FIG. 5) displays each fragment 401 to the designer identifying all content that specifies a reference 506. This is achieved by parsing the content of the fragment 401 using syntax recognition of reference type constructs. In this preferred embodiment of the practice of the present invention, syntaxes to used in the comparison by the reference tool 500 to perform reference 506 recognition are provided from two sources. The first is a pre-defined table containing all known HTML constructs in current existence at the time the present invention was embodied. The second source is from the repository designer, who can specify additional syntaxes not found in and added to the existing table using a function of the reference tool 500. For each reference 506 so identified, the designer may instruct the reference tool 500 to delete it.

Figure 5A:
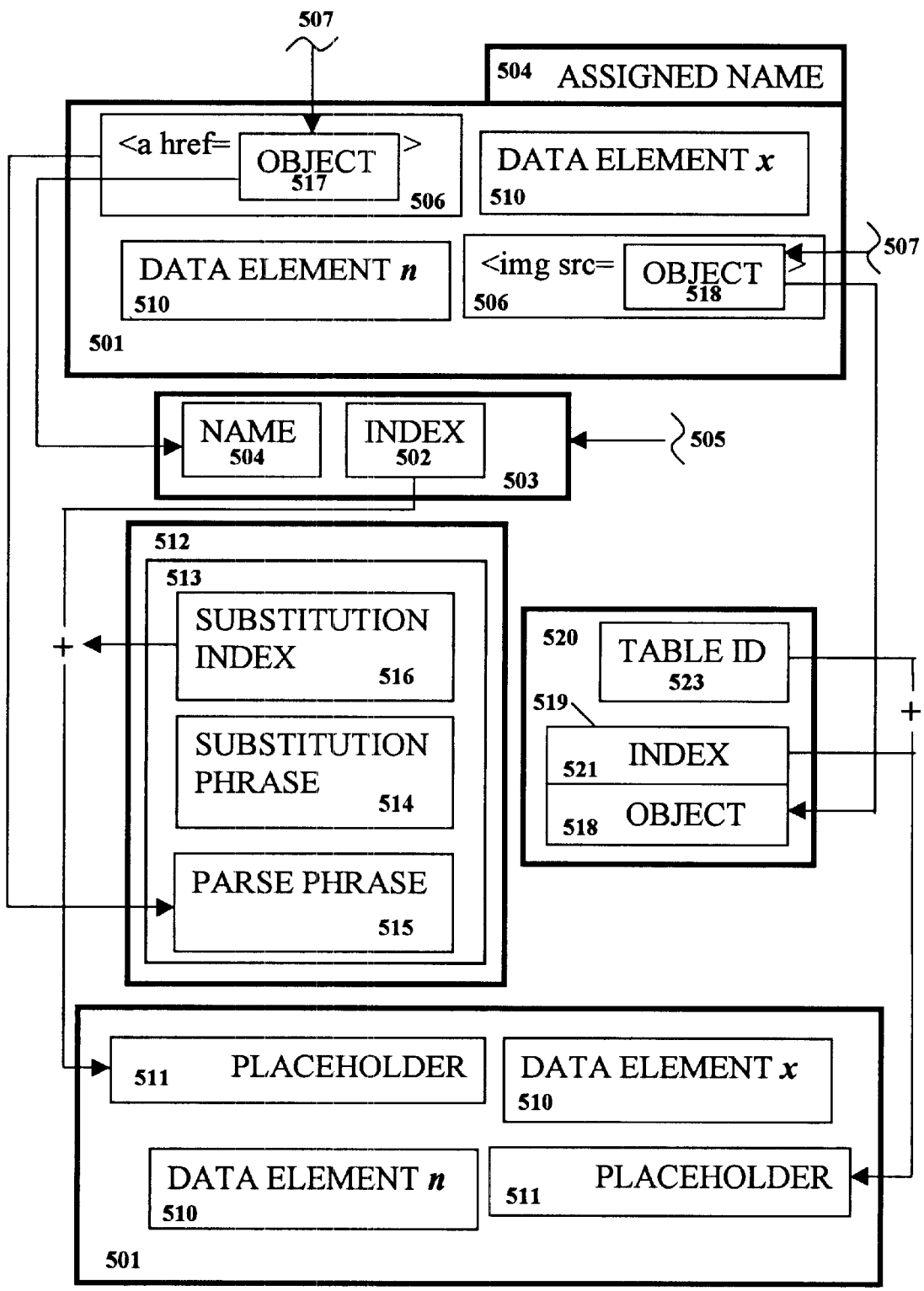
FIG. 5A is an exploded block diagram of elements from FIG. 5. It illustrates a greater a level of detail of components created by the repository designer and their modification into a substituted form by the method and process of the current invention.

With respect to FIG. 5, FIG. 5A is an exploded view of exemplary references 506 contained within a design page 501. In this embodiment of the present invention, the order or frequency of appearance of references 506 or non-reference data elements 510 within a design page 501 is arbitrary and at the discretion of the designer. For each reference 506 that is retained by the designer the tool 500 generates a "placeholder symbol" 511. This is accomplished by the reference tool 500 searching a pre-defined table of allowable substitutions. This table is denoted as the "substitution table" 512. Each entry 513 within the substitution table 512 has three values. The first value 514 is an incomplete or syntactically invalid form of the original reference 506 and there exists one, unique value for each valid reference 506 construct. This value 514 is referred to herein as a "substitution phrase". The second value is an example of a valid reference 506 construct, minus any explicit object 507 value, and is denoted as the "parse phrase" 515. Each table entry 513 is uniquely enumerated and the assigned number is referred to as the "substitution index" 516. Comparing the syntax of the reference 506 to each parse phrase 515 locates the substitution index 516 of the specific entry 513. If the object 507 specifies a governed content object 517, the reference tool 500 locates the page table 505 entry 503 of the design page 501 by searching on the value of the object 517, which is equivalent in value to the assigned name 504. The index 502 of the design page 501 is retrieved from the entry 503 and is paired with the substitution index 516 in replacement of the original reference 506. If the object 507 specifies an ungoverned content object 518, the tool 500 creates an entry 519 in a separate temporary table 520 in which to store the object 518. The index value 521 of the table entry 519 and the table identifier 523 are paired with the substitution index 516 in replacement of the original reference 506. If the reference 506 includes other required values, the reference tool 500 appends these values at the end of the placeholder symbol 511.

As the next step, the reference tool 500 (FIG. 5) types the fragments 401 (FIG. 4) based on parse phrase 515 (FIG. 5A) content. If the fragment 401 contained no references 506, it is typed as a body fragment. If the fragment 401 had at least one reference 506 whose object 507 was identified as governed content 517, it is typed as a target fragment. If all objects 507 within the fragment 401 were. identified as ungoverned content 518, the fragment 401 is typed as artwork.

Categorization as a frame type fragment 401 (FIG. 4) is achieved by examining the content within a fragment 401 for frame constructs. In this preferred embodiment of the practice 20 of the present invention, the frame construct provided by HTML is a well-known method by which designers can sub-divide the display of a client computer 100 (FIG. 1) into separate viewable areas, known as "frames". Data that generates the framing on a computer display contains none of the content actually displayed within each frame. This presents a difficulty in controlling the content of a frame-based response 201 (FIG. 2). In this instance, the response 201 that is sent to the client 100 might contain only a description of the frame layout. In addition, the syntax of a frame declaration can specify an object 507 (FIG. 5) that is processed by a prior art method that involves only the browser 111 and communications process 104. In this instance, should the object 507 be a governed content object 517, control of the indicated governed content 110 by the DAC 106 would not be possible. To overcome these problems, the reference tool 500, upon the detection of framing syntax within a fragment 401, marks the fragment 401 with an additional attribute. This value indicates that references 506 that specify frames are to be handled by a recursive call of the form module 302 when it is time to use the fragment 401 in the construction of a page 402.

Figure 6:
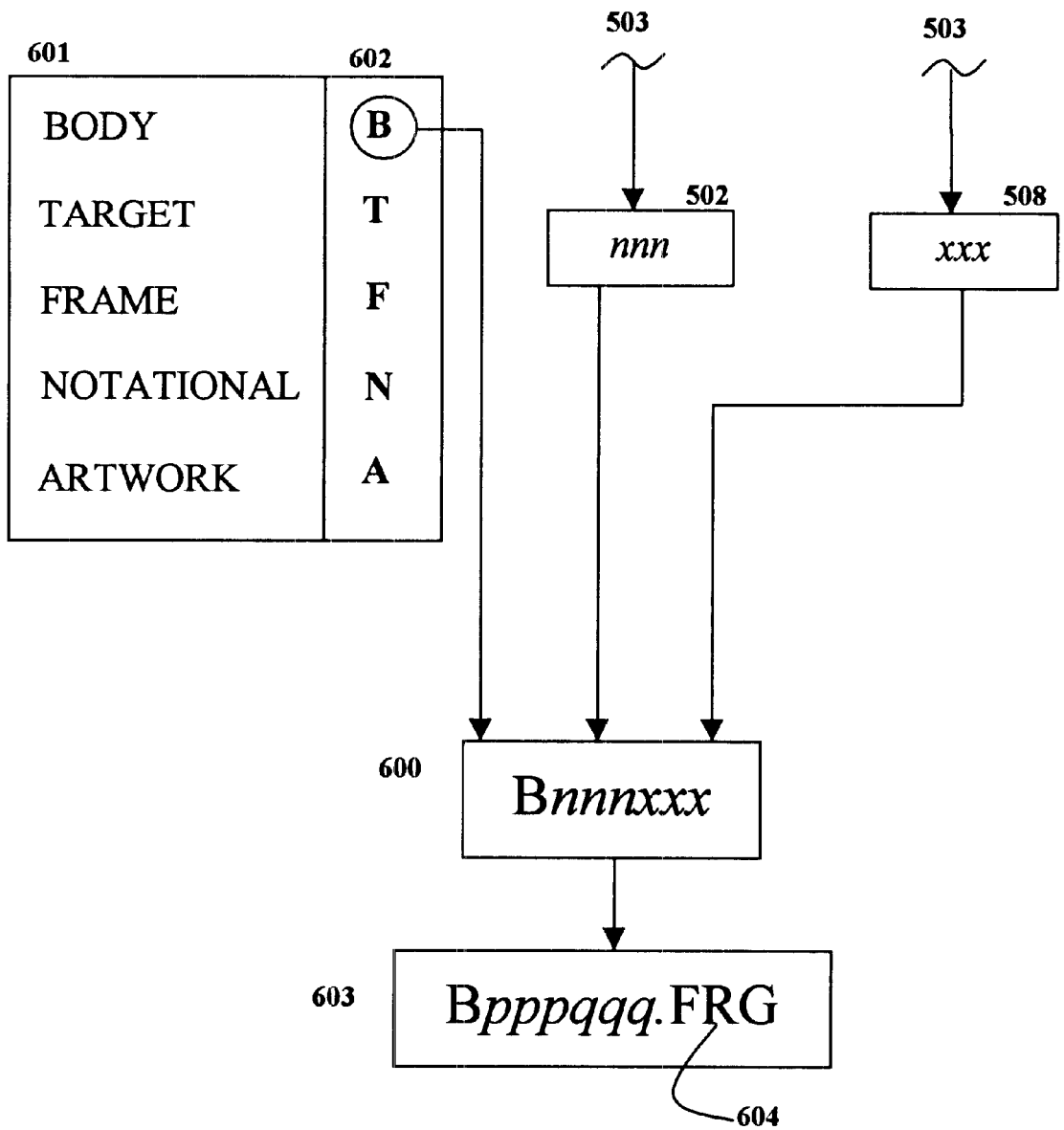
FIG. 6 is a diagram depicting the assignment of values to form the identities of two data structures used by the method and process of the current invention.

When substitution processing is complete, and as illustrated by FIG. 6, the reference tool 500 (FIG. 5) generates a unique "build code" 600 for each fragment 401 (FIG. 4). The reference tool 500 constructs a build code 600 by combining the symbol 602 used to represent the fragment type 601, the index 502 of the parent design page 501 and the fragment identifier 508. The reference tool 500 converts the build code 600 value into a sequence of one or more symbols. The resulting symbol sequence forms the filename string 603 of the fragment 401. A filename extension 604 may be added to the string 603 to fully qualify it for use with the file storage mechanism. The filename created from the build code 600 facilitates the accessing of a fragment 401 held on the storage device 103 by the DAC 106 (FIG. 1). When all fragments 401 of a design page 501 have been assigned build codes 600, the reference tool 500 modifies the fragment assembly list 509 of the design page entry 503 by replacing each fragment index 508 with the corresponding build code 600.

Figure 7:
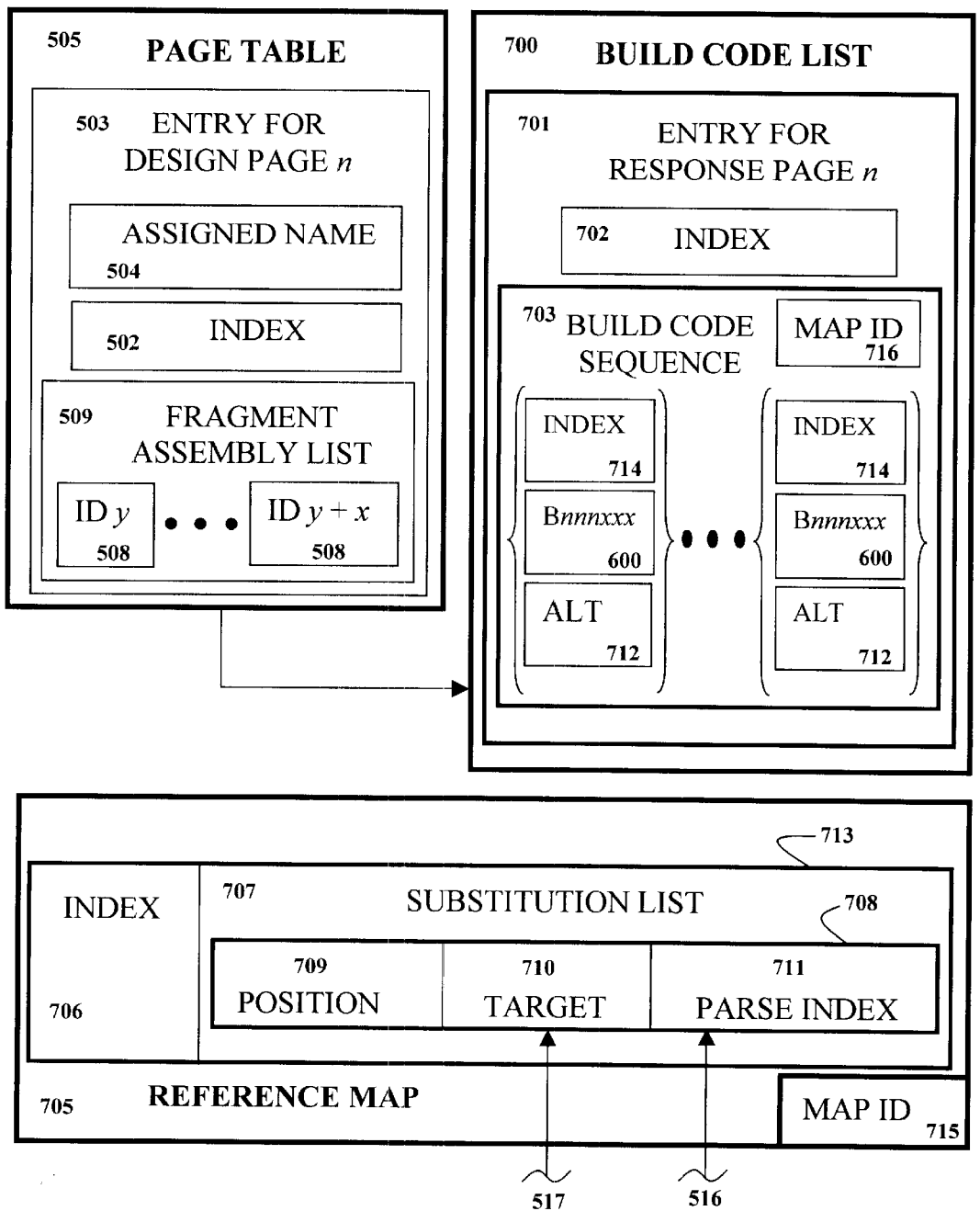
FIG. 7 is a block diagram illustrating data structures used by the method and process of the current invention that allow for the content of the repository to be treated in a dynamic fashion.

With respect to FIG. 7, the page table 505 (FIG. 5) is converted by the reference tool 500 to a data structure denoted herein as the "build code list" 700. The fragment assembly list 509 with its build code 600 (FIG. 6) content creates the "build code sequence" 703 for the design page 501, which is now represented by a response page entry 701.

The next step involves the reference tool 500 (FIG. 5) constructing a "reference map" 705 (FIG. 7) for each response page entry 701 within the list 700. A reference map 705 resolves references 506 to governed content 110 (FIG. 1) for a build code sequence 703. Each reference map 705 is assigned a unique identifier 715. The identifier 715 is recorded as map id 716 in the build code sequence 703 to which the map 705 belongs. Each build code 600 (FIG. 6) within the build code sequence 703 is given an entry 713 in the reference map 705. A unique index value 706 is created for each entry 713. The index value 706 is saved as an index notation 714 of the build code 600 representation.

When all entries 701 (FIG. 7) have been reference mapped, the reference tool 500 (FIG. 5) begins the process of "fix-up". From the build code list 700, each entry 701 is processed in turn. From each entry 701, the tool 500 inputs the build code sequence 703. Reading each build code 600 (FIG. 6) from the sequence 703, the tool 500 identifies and inputs each fragment 401 (FIG. 4) in turn. As each fragment 401 is processed, its contents are copied into a new, empty file identified by the derived name 603. If a build code 600 appears more than once or in to multiple sequences 703, only the first occurrence of the code 600 causes the fragment 401 to be copied. As the copy is performed, the fragment 401 is parsed for placeholders 511 (FIG. 5A). If a placeholder 511 that was created from a governed object 517 is encountered, it is replaced within the new file by a substitution phrase 514. The particular substitution phrase 514 is located by using the index 516 recorded in the placeholder 511. The replacement within the new file is denoted as the link reference 403. The substitution list 707 of the map entry 713 is then accessed. An entry 708 is created in the list 707. From the placeholder 511, the substitution index 516 is recorded as the parse index 711 and the object 517 is recorded as the target 710. Any other values that are found in the placeholder 511 are stored with the target 710. The sequence count of the current placeholder 511, relative only to other placeholders 511 specifying a governed content object 517, is recorded as the position 709. If the placeholder 511 identifies an ungoverned content object 518, the table entry 519 is copied without modification as the replacement for the placeholder 511. The table entry 519 is deleted and no entry is made in the substitution list 707.

Figure 8:
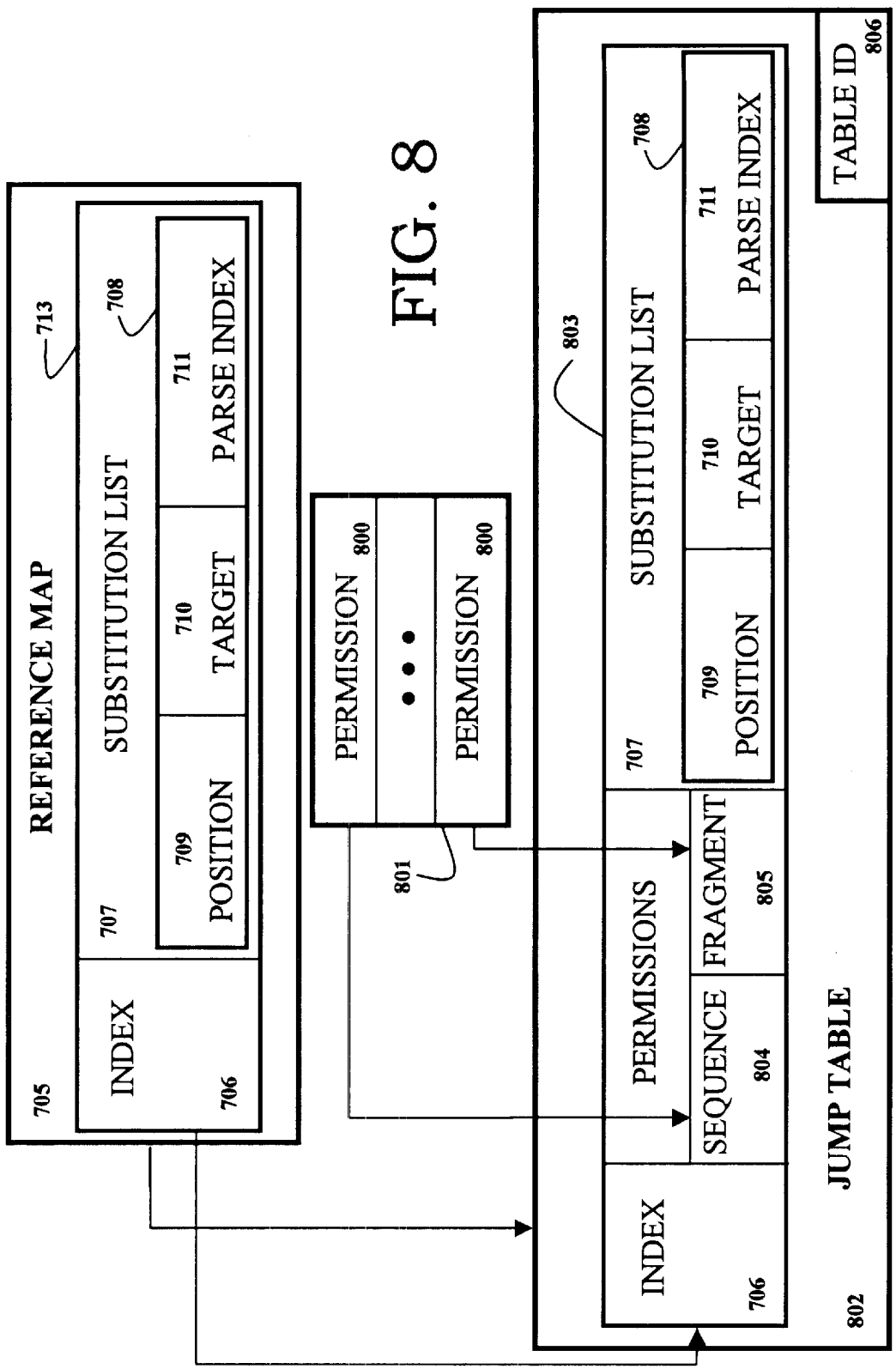
FIG. 8 is a block diagram depicting the conversion of one data structure to another by the method and process of the current invention during the assignment of privilege information to the content by the repository designer.

With respect to FIG. 8, when the copy process for each fragment 401 (FIG. 4) in a build code sequence 703: (FIG. 7) is complete, the reference tool 500 (FIG. 5) prompts the designer to supply "permission levels" 800. A permission level 800 can apply to each build code 600 (FIG. 6) and to the entire sequence 703. The permission level 800 is a single value taken from a set values 801 used to describe varying degrees of privilege. The actual values used are arbitrary, however, the set of values 801 must contain at least two elements and each element 800 must describe a different quality of permission.

With the addition of permission levels 800 (FIG. 8), the reference tool 500 (FIG. 5) converts each reference map 705 (FIG. 7) in turn. The data structure created by the conversion is referred to as a "jump table" 802 with each entry being denoted as a "jump table entry" 803. Each entry 803 utilizes the content of its corresponding map entry 713 and adds the assigned permission levels 804, 805. The map identifier 716 recorded with the sequence 703 is updated to reflect the value of the jump table identifier 806.

The creation of all jump tables 802 (FIG. 8) concludes the fix-up process. At this point, all fragments 401 (FIG. 4), the build code list 700 (FIG. 7) and the jump tables 802 are eligible to be placed on the storage device 103 (FIG. 1) as governed content 110 with their physical location made known to the DAC 106. Before this, and if desired, the designer can re-invoke the reference tool 500 (FIG. 5) to perform an optional additional process. The process begins with the reference tool 500 allowing the designer to create new jump tables 802 or additional entries 803 within existing tables 802. Elements so created reference existing build codes 600 (FIG. 6) or sequences 703; however, they permit the arrangement of these elements into alternate orders of sequence. Then, using any or all jump tables 802 as input, build codes 600 may have their entry within a sequence 703 modified to reflect one or more alternate choices 712 (FIG. 7). Each alternate 712 can describe another build code 600 through a particular jump table entry 803 or, an alternate sequence 703 using a different table 802. An alternate 712 is used during the construction of a privileged type response 203. In the event either permission 804,805 of the build code's 600 original entry 803 is not met; the alternate 712 will be examined to see if it qualifies as a suitable replacement.

In this preferred embodiment of the practice of the present invention, privileged type responses 203 (FIG. 2) may share fragments 401 (FIG. 4); build code sequences 703 (FIG. 7), jump tables 802 (FIG. 8) or jump table entries 803 to any extent except that any combination must form a complete syntactically valid page 403 before its delivery to the client 100 (FIG. 1) as part of a response 201. To test the validity of a response 201, the designer need only attempt to render the response 201 using the browser 111 and display device of a potential or test client 100. If the response 201 renders and functionally behaves as the designer intended, it is valid.

Figure 9:
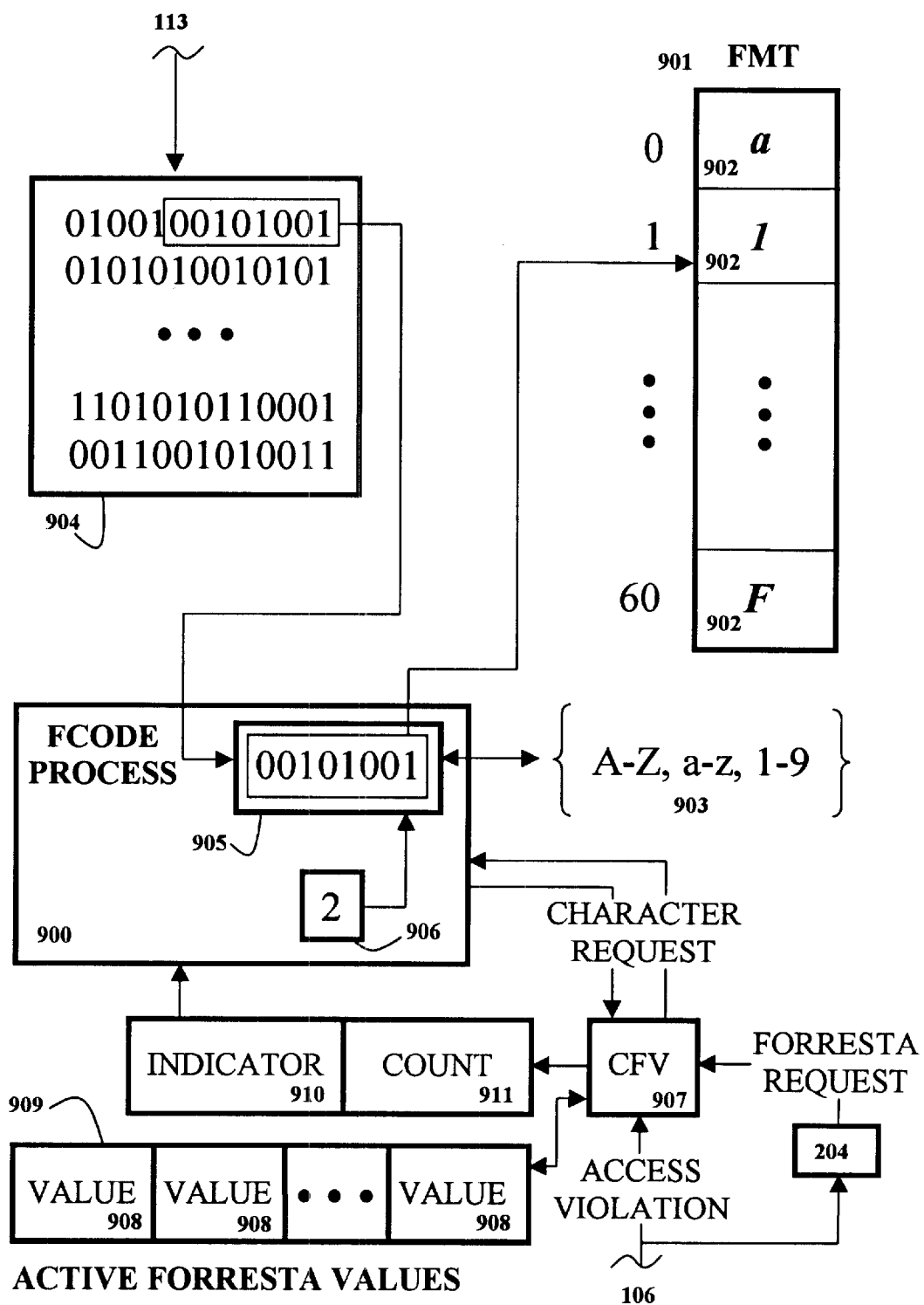
FIG. 9 is a block diagram illustrating the required manipulation of values in order to form a forresta value.

As described earlier, the determination of privilege associated with a forresting type request 204 (FIG. 2) is derived from the "forresta argument" 206 (FIG. 2A) with the desired content identified by the "destination argument" 207. All forresta values, except the anonymous user value, are generated utilizing a time and memory based routine that uses multiple random values. In this preferred embodiment of the present invention, the resulting format of a forresta value is an "n"-byte character sequence that has no conflicting meaning within the coding constructs of a response 201. To create a forresta value sequence requires use of the following algorithm. This algorithm is defined by the current preferred embodiment of the present invention and is referred to herein as the "fcode process" 900 (FIG. 9). In the preferred embodiment of the current invention, the fcode process 900 is a routine contained. within the session module 301 (FIG. 3).

The fcode process 900 (FIG. 9) performs a self-initialization each time the DAC 106 (FIG. 1) is initialized from start-up as an executing process on the server 102. This self-initialization facilitates the creation of a data table 901 containing sixty-one (61) values, which is illustrated in FIG. 9. This table 901 is referred to as the "forresta map table" ("FMT"). Each entry 902 in the table 901 contains one symbol, whose appearance within the table 901 is unique, that is a member of the "key set" 903. In this embodiment of the present invention, the key set 903 contains one each, of the upper-case characters "A" through "Z" inclusive, the lowercase characters "a" through "z" inclusive, and the character representations of the digits "1" through "9" inclusive.

The process of FMT 901 (FIG. 9) creation begins with the fcode process 900 querying a prior art process available through the operating system 113 (FIG. 1) for a random value. In this preferred embodiment of the current invention, the requested value is in the range of 64 to 4096 inclusive, although other bounding ranges are possible. The fcode process 900 then requests a block of memory 904 from the operating system 113 using the returned random value to specify the size of the memory block 904. In this request, the fcode process 900 specifies that the memory block 904 should not be initialized and it should not originate from memory resources already assigned to the DAC 106. By not initialized it is meant that the contents of the memory block 904 should not be altered from its pre-request state as it existed within the resources of the operating system 113. The point of origin of the memory block 904 must be common to any server 102 process requesting memory resources. A common memory resource may be identified and described using the well-known term, "global memory heap".

The content of the memory bock 904 (FIG. 9) is accepted as input by the fcode process 900. The memory block 904 is examined for the presence of a signature value employed by the fcode process 900. The signature value identifies a memory block 904 that is not eligible for use by the fcode process 900. The signature value causes the current memory block to be discarded and a new memory block 904 to be requested. In this preferred embodiment of the present invention, the signature value is identified by examining the memory block 904 for the same value in each byte. The fcode process 900 initially sets a "comparison field" 905 equal to the first "n" bits of the memory block 904. In this preferred embodiment of the present invention, "n" is the minimum number of bits required to represent a byte on the server 102 (FIG. 1) on which the fcode process 900 is executing. If the numerical value represented in the comparison field 905 is equal to one of the values of the key set 903, it is compared against existing entries 902 in the FMT 901, if any. If the value is unique within the FMT 901, it is stored at the next, sequentially available entry 902. If the contents of the comparison field 905 duplicates an FMT entry 902 or is not a desired value, the fcode process 900 refreshes the comparison field 905 in the following manner.

A refresh of the comparison field 905 (FIG. 9) is accomplished with a logical left shift of the bits within the field 905, ignoring any carry. To replace discarded bits, new bits are serially retrieved from the next available within the memory block 904. The size of the shift is equal to a "shift count" 906 whose initial value is one. Each time a value in the comparison field 905 duplicates an entry 902 in the FMT 901, the fcode process 900 will increment the shift count 906 by one; however, if the shift count value exceeds one-half the size of the memory block 904, the fcode process 900 will reset it to one. If the size of the shift exceeds the number of bits within the comparison field 905, new bits are serially brought in from the memory block 904 until the shift is completed. If no more bits are available from the memory block 904, the fcode process 900 requests a new random number and uses it to obtain a new block of memory from the operating system 113 (FIG. 1). Any subsequent new memory block is always requested using the same initialization and allocation constraints as imposed on the first. Once the new block has been received by the fcode process 900, the previous block is cleared of its contents by setting each byte contained within it to the same, arbitrarily chosen value and returned to the memory management process of the operating system 113. The fcode process 90 will repeat these steps until all entries 902 within the FMT 901 are complete.

To create a forresta value, the session module 301 (FIG. 3) employs the following routine, which exists as a callable process included with and unique to the session module 301. This routine is denoted as the "create forresta value" ("CFV") 907 (FIG. 9) process;

The CFV 907 (FIG. 9) accepts as input, the forresta argument 206 (FIG. 2A) of the forresting type request 204 being processed. A correct argument 206 will be, at a minimum, equivalent to the anonymous user value represented as a proper length sequence of contiguous bytes. If the CFV 907 does not recognize the format of the argument 206, it returns an access violation return code. If the argument 206 does not resolve to the anonymous user value, the CFV 907 compares the argument 206 against each entry 908 of a list 909, which it maintains, that contains all forresta values currently in use. If the argument 206 does not match any value contained within the list 909, the CFV 907 returns an access violation return code. If the argument 206 is equal to the anonymous user value, the CFV 907 proceeds without examining the list 909.

The CFV 907 (FIG. 9) proceeds to form a new forresta value by invoking the fcode process 900 for each character required by the forresta format. The number of characters required is arbitrary. However, in this preferred embodiment of the present invention, a minimum of eight (8) characters is imposed. In response, the fcode process 900 requests a random number from a prior art random number generation process in the range of one (1) to sixty-one (61) inclusive and returns the character held by the entry 902 at that relative index of the FMT 901. The CFV 907 will repeat its request until sufficient characters have been retrieved. When a new forresta value has been created, the CFV 907 compares the new value to entries 908 in the existing forresta value list 909, if any. If the new forresta value duplicates an entry 908, it is discarded and the CFV 907 will repeat the process of forresta value generation. When a new, unique forresta value is obtained, the CFV 907 discards the original argument 206 (FIG. 2A). The new forresta value is then added to the list 909 of active forresta values. When the argument 206 is not equal to the anonymous user value, the CFV 907 removes and discards the list entry 908 that the argument 206 value matched.

The CFV 907 (FIG. 9) has an additional capability that is invoked whenever an access violation is detected by any routine within the DAC 106 (FIG. 1), including the possibility that the CFV 907 will invoke itself under this condition. When a violation occurs, the detecting routine signals the CFV to perform a "rotation" of the FMT 901. The CFV 907 accomplishes this by first requesting the current time value from the operating system 113 or other prior art process in a format of hours, minutes and seconds. The portion of the time value that represents seconds is supplied as input 911 to the fcode process 900 along with a unique indicator value 910. Upon recognizing the indicator 910, the fcode process 900 changes the position of the entries 902 in the FMT 901. This is accomplished by applying a logical, circular shift to each entry's 902 position using an iterative count 911 equal to the seconds value passed by the CFV 907. If the seconds value is zero, the fcode process 900 uses the value sixty (60) as the iteration count 911.

Figure 10:
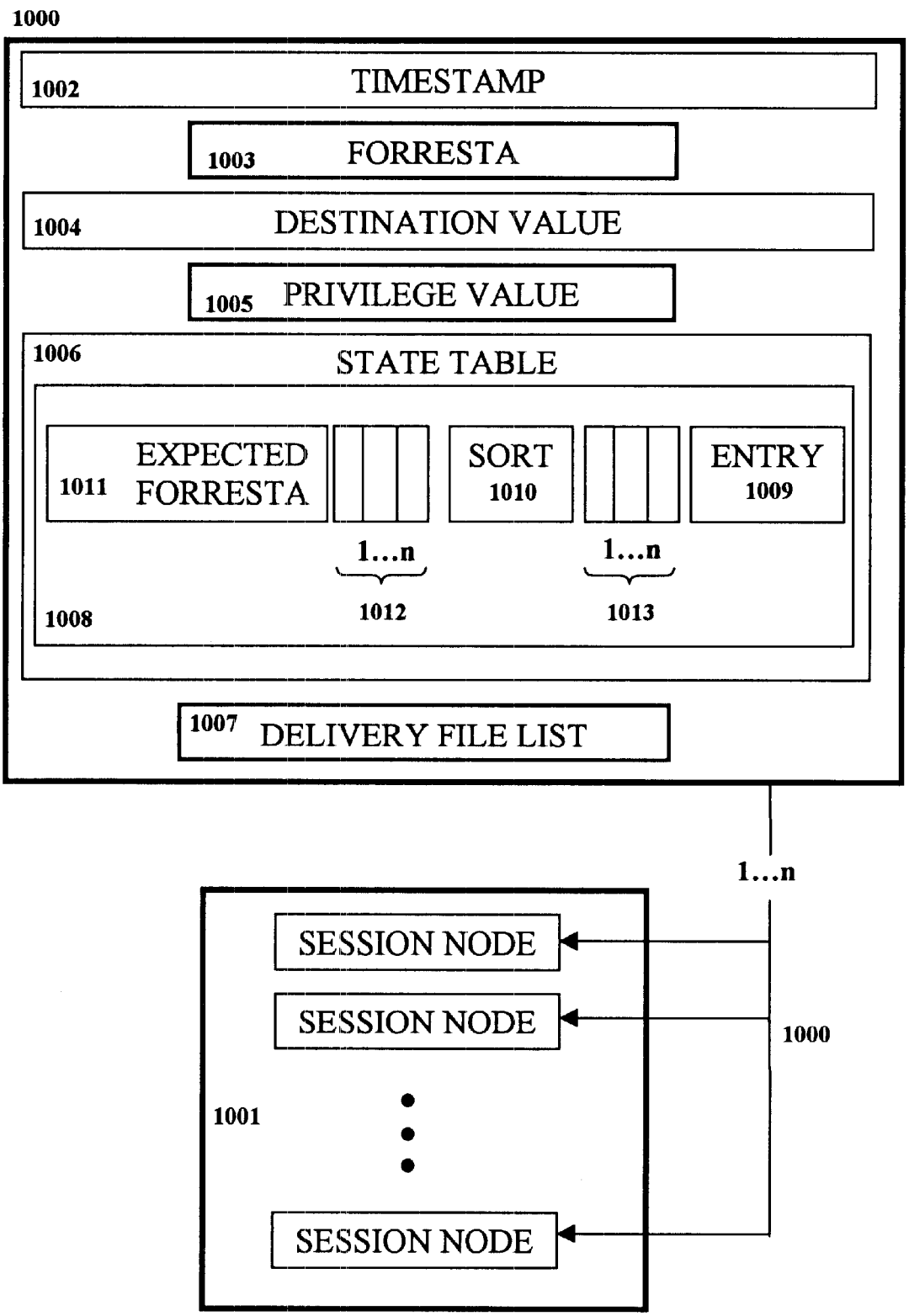
FIG. 10 is a block diagram of the data structures used by the method and process of the current invention to maintain information about clients making requests of the repository.

As forresting type requests 204 (FIG. 2) are delivered from 104 (FIG. 1) to the access module 300 (FIG. 3) each is reformatted by the access module 300 into a "session node" 1000 (FIG. 10) data structure. FIG. 10 shows an exploded view of an exemplary session node 1000. The session node 1000 is then forwarded as an input argument in a process call to the session module 301. The input argument to the session module 301 is denoted as the "current" session node 1000 for convenience.

Session nodes 1000 (FIG. 10) are maintained as a set in a data structure referred to herein as a "session list" 1001. In this preferred embodiment of the present invention, the session list 1001 is implemented within a memory space assigned to the DAC 106 (FIG. 1) by the memory management process of the operating system 113. When the DAC 106 is initialized from start-up, the session list 1001 (FIG. 10) is formatted to retain zero or more session nodes 1000 by the session module 301 (FIG. 3). In the DAC's 106 initialized state after start-up there are no session nodes 1000 present within the session list 1001. Session nodes 1000 are added or removed from the session list 1001 by the session module 301, however; any component of the DAC 106 may reference the contents of the list 1001 to facilitate its function.

When the session module, 301 (FIG. 3) is invoked by the access module 300 and if the session list 1001 (FIG. 10) is not empty, the session module 301 will examine each resident node 1000 for the "time-out" condition. Timing out is a quality determined by measuring the inactivity interval of the client 100 (FIG. 1) with respect to DAC 106 interaction. In this preferred embodiment of the practice of the present invention, the time interval between successive requests 200 (FIG. 2) of a single client 100 received by the DAC 106 is the determining factor. of the time-out condition. Typically, this period is measured in units of seconds. The session node 1000, when initially created by the access module 300 is marked with a timestamp 1002 that indicates its moment of creation. In this preferred embodiment of the present invention, the explicit timestamp value is provided by a prior art process resident within the operating system 113. During the examination of a node 1000 that is list 1001 resident by the session module 301, the current value of time is retrieved from the same prior art process that provided the initial timestamp. With the assumption that time values always increase, the timestamp 1002 is subtracted from the current time value. If the result is less than a repository designer selected value, timeout has not occurred and the session module 301 proceeds to the next session node 1000 in the list 1001, if any. If the result is equal to or greater than the selected value, timeout has occurred and the session node 1000 is removed from the session list 1001. Removal of a node 1000 from the list 1001 also clears the data content of the node 1000 and removes its forresta value 1003 from the active forresta list 909 (FIG. 9) maintained by the CFV 907 process.

With the completion of time-out processing, the session module 301 (FIG. 3) performs an equivalence comparison test between the forresta value 1003 (FIG. 10) contained within the session node 1000 that is current and the anonymous user value. If the values are equal, the session module 301 forwards the current node as an input argument in a process call to the form module 302. If the result of the comparison is not equivalence, the session module 301 performs an equivalence test between the forresta value 1003 of the current node and the forresta values contained within nodes 1000 resident on the session list 1001. If the session list 1001 is empty, the current node is discarded by the session module 301 and a return of process control with a status code is made to the access module 300. If a node 1000, which is resident on the list 1001, has a forresta value 1003 that tests equally and there remain unexamined nodes 1000, the session module 301 continues the examination. If multiple nodes 1000 satisfy the comparison test with the forresta value 1003 of the current node, the session module 301 removes all such nodes 1000 from the list 1001 and clears the data content from each. The forresta value 1003 is then removed from the active forresta list 909 (FIG. 9). In this instance, the session module 301 returns an access violation value.

With the absence of an access violation, the destination value 1004 (FIG. 10) of the current node is placed into the appropriate field 1004 of the list 1001 resident node 1000. The session module 301 (FIG. 3) then forwards the address of the node 1000 that is list 1001 resident as an input argument in a process call to the form module 302. The node 1000 that is current is cleared of data content and discarded.

When the form module 302 (FIG. 3) receives a session node 1000 address (FIG. 10), it verifies the argument by requesting the address of the session list 1001 from the session module 301. The value of the input argument is then applied against the contents of the list 1001. If the input argument address references an entry within the list 1001, the form module 302 proceeds. If the input argument address does not properly reference a list 1001 entry, the form module 302 returns an access violation. With a valid address, the form module 302 accesses the referenced node 1000 and extracts the privilege value 1005, the destination value 1004 and the state table 1006. The privilege value 1005 is derived from information returned by the authority process 105 (FIG. 1). The state table 1006 is a data structure that represents the current request 200/response 201 (FIG. 2) relationship existing between the client 100 and the DAC 106. The destination 1004 is a copy of the destination argument 207 (FIG. 2A) and any other supplied values received as part of the forresting type request 204. In the following, each of these elements is described.

The notion of "privilege" is determined using the authority assigned to a user 100 (FIG. 1) by the authority process 105. Without regard to the specifics of the method of the authority process 105, the following steps occur when a destination 1004 (FIG. 10) references sensitive data 107.

If the session node 1000 (FIG. 10) does not contain a privilege value 1005 for the requesting client 100 (FIG. 1), the form module 302 (FIG. 3) returns process control to the access module 300 with a signature code indicating the absence of privilege. The signature code is a new, unique forresta value 1003 obtained by the form module 302 invoking the CFV 907 (FIG. 9). The format of the process call in conjunction with the signature code causes the access module 300 to invoke the authority process 105 and a transfer of process control is negotiated between the two routines. The transfer and subsequent return of process control between the access module 300 and the authority process 105 is dependent on the operation of the authority process 105 and the operating system 113 of the server 102 and is not unique to or described by this embodiment of the present invention. Before the access module 300 relinquishes control, it establishes a "watchdog interrupt" that is set for a pre-determined amount of time. A watchdog interrupt is a well-known method for allowing the operating system of a computer to invoke a waiting process if a specified period elapses. If the watchdog interrupt returns process control to the access module 300, the request 204 (FIG. 2) is ignored, the session node 1000 is discarded and the form module 302 is instructed to discard the outstanding signature value. If the access module 300 receives a response from the authority process 105 before the watchdog interrupt returns, the watchdog interrupt request is cancelled. If the authority process 105 denies access, the request 204 is ignored, the session node 1000 discarded and the form module 302 is instructed to discard the signature value. If authority is granted, the access module 300 forwards the authority value, the signature code received from the form module 302 and the session node 1000 to the session module 301.

Upon recognizing that an authority value has been passed to it, the session module 301 (FIG. 3) invokes the form module 302 in a process call to determine the validity of the signature code. If the form module 302 acknowledges that the signature code represents an outstanding request, the session module 301 proceeds, otherwise an access violation is generated. In the absence of an access violation, the session module 301 accesses a file that contains "criteria information". Criteria information is defined and created by the designer using the reference tool 500 (FIG. 5) and is considered governed content 110 (FIG. 1) although it is not a fragment 401 (FIG. 4) and is never used within a response 201 (FIG. 2). Criteria information provides the mapping between values returned by the authority process 105 and permission levels 800 (FIG. 8) established for governed content 110. The criteria information value obtained in this manner becomes the privilege value 1005 (FIG. 10) of the client 100.

When a privilege value 1005 (FIG. 10) has been determined, the session node 1000 becomes an "authorized session node". Authorized session nodes 1000 are placed on the session list 1001 by the session module 302 (FIG. 3). During processing, authorized session nodes 1000 remain list 1001 resident as long as they do not timeout or experience an access violation. Additionally, a session node 1000 will be removed from the list 1001 if the client 100 (FIG. 1) indicates that no further request 200 (FIG. 2) is forthcoming. A forresting type request 204 for governed content 110 will cause the session module 301 (FIG. 3) to index 1006 the session list 1001 using the value of the forresta argument 206 (FIG. 2A). By this mechanism, a session node 1000 for a particular client 100 (FIG. 1) is located. If the forresta argument 206 does not match a forresta value 1003 contained within any node 1000 resident on the list 1001, the request 204 is ignored.

When the session node 1000 (FIG. 10) has become list 1001 resident, the session module 301 (FIG. 3) returns control to the access module 300. The access module 300 then instructs the form module 302 to discard the signature value. The access module 300 then restarts the processing of the forresting type request 204 (FIG. 2) unencumbered by passing the session node 1000 as an input argument in a process call to the session module 301.

The state table 1006 (FIG. 10) is constructed during the creation of a page 403 (FIG. 4) is by the form module 302 (FIG. 3). This process begins after the response page entry 701 (FIG. 7) identified by the destination 1004 has been retrieved. Fragments 401 identified by the build code sequence 703 contained within the entry 701 are parsed for link references 403. This is performed using the jump table 802 (FIG. 8) identified by the map identifier 716 contained with the sequence 703. A jump table entry 803 yields the substitution list 707 of the fragment 401. Each target 710 contained within the list 707 creates an entry in the state table 1006.

The state table 1006 (FIG. 10) is used by the form module 302 (FIG. 3) to determine certain access violation conditions. These conditions determine if a forresting type request 204 (FIGS. 2, 2A) is received outside of an expected order, or there has been an alteration of the forresta value 206 (FIG. 2A) since it was assigned. Each state table entry 1008 contains one or more occurrences of the "entry field" 1009, the "sorted order field" 1010 and the "expected forresta field" 1011. The state table 1006 is modified by the form module 302 every time a privileged response 203 (FIG. 2) is created. Entries 1008 are made in the state table 1006 for each build code list index 702 ((FIG. 7) used in constructing the privileged response 203. If the destination 1004 could not be generated or executed by the client 100 using the values referenced by the state table 1006, the form module 302 raises an access violation and returns. If the destination 1004 and forresta 1003 are legitimate, the session node 1000 will be used as an input argument to the form module 302.

The legitimacy of destination 1004 (FIG. 10) and forresta 1003 values is determined in the following manner. During the creation of a page 403 (FIG. 4), the sorted order field 1010 and the expected forresta argument field 1011 are also created. This is accomplished as each substitution list 707 (FIG. 7) is processed for placeholders 511 (FIG. 5). Each position 709 and target 710 pair of an entry 708 is used to create an entry 1013 in the sorted order field 1010. The entry 1013 is indexed by a key, whose value is supplied by the target 709. The position 710 is stored as data particular to that key. Each forresta value 1003 that is used in the creation of a link reference 403 also creates an entry 1012 in the expected forresta field 1011. This entry 1012 is indexed by a key, whose value is supplied by the position 710. The specific forresta value 1003 is stored as data particular to that key.

When a forresting type request 204 (FIG. 2) is received, a specific session node 1000 (FIG. 10) is identified by the matching the forresta argument value 206 (FIG. 2A) with the contents of a forresta field 1003 contained within a session node 1000. Once found, the destination field 1004 is updated using the value of the destination argument 207. Alternatively, the session node 1000 may be located by matching both forresta 206 and destination 207 arguments before updating the destination field 1004. If a session node 1000 is not found using this search, the access module 300 (FIG. 3) generates an access violation condition. Upon a successful match, the destination value 1004 is compared against sorted order field entries 1013. If the destination value 1004 fails to match any sorted order field entry 1013, an access violation is returned. Next, the forresta value 1003 is compared against entries 1012 within the expected forresta field 1011. If no match is found, an access violation is returned. If the expected forresta field entry 1012 has already been marked as being matched against a request 204 without an intervening update of the state table 1006, an access violation is returned. If the position value of the expected forresta field entry 1012 does not match the position value of the sorted order field entry 1013, an access violation is returned. If there is no access violation, the session node 1000 is marked as "valid". A valid session node 1000 may use the value of the list entry 1009 to retrieve a build code list entry 701 (FIG. 7).

With the receipt of a valid session node 1000 (FIG. 10), the form module 302 (FIG. 3) begins assemblage of the privileged response 203 (FIG. 2). What is to be included in the response 203 is determined by the destination value 1005. The form module 302 begins by requesting the allocation of a new, empty file, denoted herein as the "delivery file" within the governed content area 110 (FIG. 1) of the storage device 103. This is achieved using the prior art method of file management provided by the operating system 113. The name identifier assigned to this file is random and unique and in this preferred embodiment of the present invention, is provided by the file management system at the request of the form module 302. The form module 302 will request one or more, new forresta values 1003 from the CFV 907 (FIG. 9) and enter them into the session node 1000 if the privilege value 1005, using its designer assigned meaning, indicates it. The form module 302 locates the response page entry 701 (FIG. 7) using the value of the destination 1004 as the index 702. The build code sequence 703 contained within the entry 701, identifies all fragments 401 (FIG. 4) that are required to create the response 203.

As a build code 600 (FIG. 6) is processed, the form module 302 (FIG. 3) will test the privilege value 1005 (FIG. 10) against each permission value 804,805 (FIG. 8) retrieved from the jump table entry 803. If the result of the operation yields denial, the form module 302 checks the build code entry for an alternate 712 (FIG. 7). If an alternate 712 exists, the sequence 703 or build code 600 referenced by the alternate 712 is examined in the same manner to determine if it may be used in constructing the privileged response 203 (FIG. 2). If no alternates 712 exist or qualify, the form module 302 exits with an access violation. If the operation yields an affirmative result, the form module 302 will retrieve the jump table 802 or entry 803 identified by the alternate 712. If the sequence permission 804 requires more privilege than held by the client 100 (FIG. 1), the form module 302 returns an access violation. If an entry 803 specifies fragment permission 805 that is unequal to the sequence permission 804, the form module 302 may skip including the fragment 401 (FIG. 4) or return an access violation. Either action is dependent on the designer assigned meaning of the permission values 800.

If the sequence permission 804 (FIG. 8) is satisfied by the privilege value 1005 (FIG. 10), the form module 302 (FIG. 3) will permit access to the build codes 600 (FIG. 6) contained within the sequence 703 (FIG. 7). If the fragment permission 805 is satisfied by the privilege value 1005, the corresponding fragment 401 (FIG. 4) is included within the response 203 (FIG. 2).

After the form module 302 (FIG. 3) retrieves the fragment 401 (FIG. 4) from the storage device 103 (FIG. 1), it re-examines the build code 600 (FIG. 6) value to determine the fragment 401 type. If the fragment 401 is a body or artwork type, its contents are appended to the delivery file and the form module 302 advances to the next entry in the build code sequence 703 (FIG. 7). If the fragment 401 is a target, the form module 302 parses the fragment 401 for link references 403.

Because each link reference 403 (FIG. 4) does not change its position relative to other references 403 that are found within a fragment 401, the form module 302 (FIG. 3) can construct a syntactically valid page 402 by using the jump table 802 (FIG. 8). Proceeding in order through the list 707 (FIG. 7), each parse index 711 is used to retrieve the corresponding substitution phrase 514 (FIG. 5). This provides the syntax of the link reference 403 next to be encountered within the fragment 401. When the substitution phrase 514 is recognized, the form module 302 reverses the substitution supplying the parse phrase 515. In this manner, link references 403 contained in a fragment 401 are undecipherable until they are ready to be transmitted to the client 100 (FIG. 1). The target 710 is incorporated into the link reference 403 as the destination argument 205 (FIG. 2A) and the forresta value 1003 (FIG. 10) is coded as the forresta argument 206. If additional values are stored with the target 710, they are incorporated into the link reference 403 in a manner consistent with the syntax in use. When the link reference 403 is executed by the client 100 (FIG. 1), a request 200 (FIG. 2) is created.

Once all fragments 401 (FIG. 4) have been processed into a privileged response 204 (FIG. 2), the form module 302 (FIG. 3) places the name of the delivery file into the session node 1000 (FIG. 10) and updates the timestamp value 1002. If the existence of previous delivery files 1007 is indicated, the form module 302 deletes them from the storage device 103 (FIG. 1) and updates the session node 1000 before making its return. Upon receiving the session node 1000 back from the form module 302, the access module 300 identifies the delivery file to communications process 104 for transmission of its contents to the client 100 as the response 201.

Figure 11:
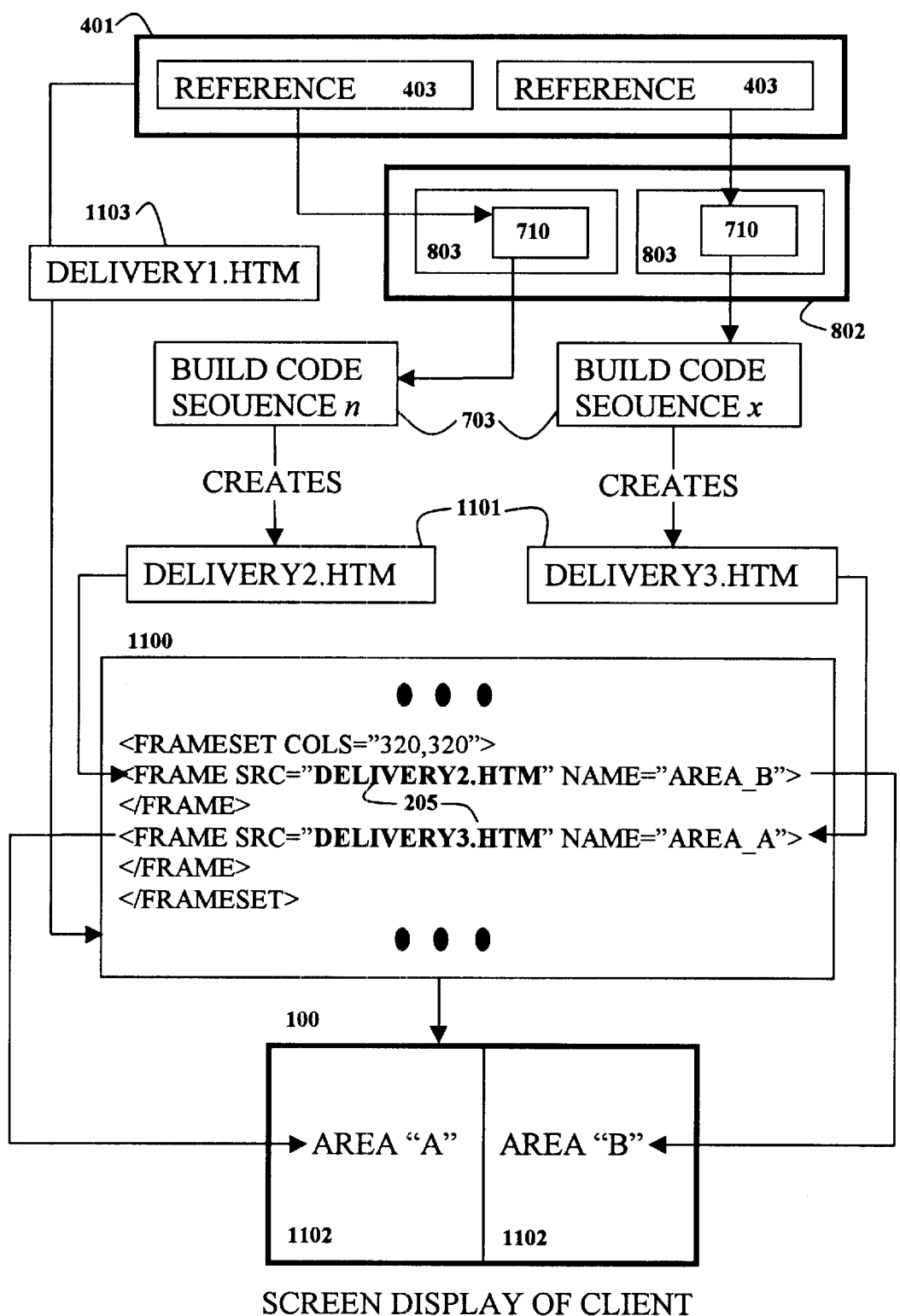
FIG. 11 is a block diagram depicting the relationship of generated content to a client display that is sub-divided into separate display areas.

As illustrated by FIG. 11, fragments 401 (FIG. 4), whose build code 600 (FIG. 6) value indicates a framing construct, are processed as follows. As the fragment 401 is parsed, a target 710 (FIG. 7) of a link reference 403 that specifies a framing sub-division. causes the form module 302 (FIG. 3) to recursively invoke itself. Before the re-invocation occurs, the form module 302 creates a primary delivery file 1100 into which the frame construct is copied up to the point of the first link reference 403 that specifies a sub-division. The form module 302 then creates a temporary session node 1000 (FIG. 10) copying all values from the original except for the destination 1004. The new destination value 1004 will contain the index 702 of the response entry 701 specified by the target 710 of the sub-division reference 403 currently being processed. The temporary session node 1000 will be used as the input argument in the re-invocation call. When the form module 302 is re-entered, it processes the temporary session node 900 (FIG. 9) as if it were the original unless another frame construct is specified by the destination 1004 contained within the temporary node 900. If this occurs, the re-invocation will repeat using the same input protocol.

Continuing with FIG. 11, frame constructs cause the form module 302 (FIG. 3) to create more than one delivery file. There will be at least one delivery file 1100 whose contents describes the framing information and, one delivery file 1101 to provide content for each created frame 1102. Assuming there is no access violation, the name of each delivery file 1102 created by a re-invocation is recorded in the session node 1000 (FIG. 10) followed by a return to the previous process instance of the form module 302. Upon its return, the form module 302 codes the name of the delivery file 1102 as the destination argument 207 (FIG. 2A) of the link reference 403 (FIG. 4) that instigated the call. The form module 302 then continues the link reference 403 parse on any remaining fragment 401 content. This process continues until the build code sequence 703 (FIG. 7) is completed. If there is an access violation, the form module 302 abandons the sequence 703 and returns to the access module 300 indicating the fault. With the absence of a violation, the name 1103 of the primary delivery file 1100, which contains the framing instructions, is indicated in the session node 1000 as the response 204 (FIG. 2) to be transmitted.

Framing constructs have one additional limitation with regards to targets 710 (FIG. 7) used in link references 403 (FIG. 4) that specify a sub-division. The target 710 of such a reference may not have a permission requirement greater than the permission 804 (FIG. 8) of the sequence 703 that created the frame construct, even if the client 100 (FIG. 1) is authorized for the higher permission. When permissions 800 are assigned by the repository designer, the reference tool 500 (FIG. 5) will not allow such a construct.

I claim:

1. In a computer system having means for allowing access to a repository of data by a plurality of clients over at least one communications link connected to said computer system, data access control means comprising:

means for interpreting the format of a data transmission occurring between said computer system and each of said clients wherein the transmission itself contains and is identified by one or more forresta identities, each of said forresta identities may be acted upon independently; and each of which is unique and unrelated to any means used to identify the parties receiving or sending such transmission;

means for creating said forresta identity as an n-byte character sequence having no conflicting meaning within the coding constructs of a transmission;

means for creating a unique session node managed by the data access control method, wherein said session node exists to identify and validate recognized forresta identities contained within each such transmission; and means for creating a construction sequence for each new transmission, said sequence identifying the components and forresta identities used to form the transmission and where said sequence results from interpreting forresta identities.

2. The system of claim 1, wherein said data access control means further includes:

means for recognizing a part of each transmission as being a unique forresta identity, which recognition means connects to further means for parsing and substituting constructs that are components of fragment files;

means for accessing a substitution table containing a set of substitution records, said substitution records including one each of a parse phrase, a substitution index and a substitution phrase;

means for examining the content of a fragment file, each said parse phrase being compared with the content of the fragment file to identify constructs;

means wherein said substitution index is paired with the object of the construct, said object being a reference to tangible data held by the repository and contained within the syntax of the construct, said pairing used as the placeholder value for the syntax of said construct; and means wherein within said means for identifying placeholders said substitution phrase is used as a replacement for a substitution index and object pair.

3. The system of claim 2, further including means for assigning a specific attribute value to the fragment file when the content of said fragment file contains a construct that indicates that the viewable area of the client display device should be sub-divided into separate areas of information display.

4. The system of claim 2, further including means for constructing a response page table that contains a unique entry for each fragment file list, said list to be used as the template for selecting and assembling data held by the repository into a transmission response as a result of receiving a forresta identity associated with a separate transmission; and further including:

means for constructing a reference map table for each said fragment file list contained within the response page table, said reference map table containing an entry for each placeholder found within fragment files identified by the list, said entry containing a position field whose value describes the relative offset position of the placeholder to other placeholders within the content of the fragment file, a parse index field whose value is the substitution index of the placeholder and a target field, whose value identifies the data held by the repository, said target field value representing the object of the placeholder.

5. The system of claim 2, wherein the data access control means further includes:

means for requesting one or more blocks of un-initialized memory from the operating system of the server computer that is the host of the repository, the size of said memory blocks specified by the value of one or more obtained random numbers;

means for detecting a signature value present within said memory block, said signature value identified by examining the memory block for a repeating value;

means for using the data bits contained within each said memory block as input to a data field to determine the values that may be stored as individual entries in the forresta map table, proceeding to the next memory block when said data bits of the current block have been exhausted;

means for creating an entry in the forresta map table when the contents of the comparison field equate to an eligible symbol;

means for modifying the contents of the comparison field by bit shifting the contents of the comparison field into discard and supplying new bits from the current memory block in use when the content of the comparison field does not equate to an eligible symbol; and means for increasing the shift count used to modify the comparison field by one each time the contents of said comparison field equate to a symbol already present as an entry in the forresta map table, until such time that the shift count is equal to a value that is more than half of the size of the current memory block in use, then resetting said shift count back to one.

6. The system of claim 4, further including means for permitting a repository designer through a user interface means to assign a permission value to each and every fragment file and response table entry.

7. The system of claim 4, further including means for permitting a repository designer through a user interface to select zero or more alternates, each said alternate being a representation of either of a fragment file or response page table entry, and for permitting said repository designer to assign each said alternate as an alternative choice to the original object of a placeholder.

8. The system of claim 1, wherein the means for the maintenance of forresta identity information of future transmissions further comprises:

means for creating and maintaining an expected forresta identity list, said list having its elements appearing in a order determined by the current execution state, said elements composed of a pre-determined forresta identity that may appear on a future transmission, and associated with said identity, a position value that specifies the expected relative position of the fragment file or other forresta identity recognized within a transmission;

means for comparing the forresta identity recognized within a transmission with the values maintained by the expected forresta list to determine if the entire transmission should be inhibited; and means for comparing the forresta identity recognized within a transmission with the values maintained by the expected forresta list to determine if fragment files associated with the expected forresta list position value should be inhibited.

9. In a computer system allowing access to a repository of data wherein access of the repository by a plurality of clients is permitted over a network communications link that may be connected to a server computer that is the custodian of the data repository, comprising in combination:

a source of data that comprises the content of the repository, said data being eligible to be returned to a client as a result of an access request made by the client;

means for organizing data into groups of one or more elements through a user interface based on criteria established by the designer of the repository;

means for using said groups individually or in combination in the formation of a response to a client based on the access made by the client;

means for controlling an access that may be executed by a client, said access being included as a component of group content;

means for the selective assignment of a permission value to said group through a user interface, said permission value specifying the access and combination scope of the group to which it is assigned;

means for determining when the intent of an access is to retrieve data held by the repository;

means for determining when an access or sequence of accesses is invalid for the repository;

means for control of accesses that may be executed by a client, said accesses being components of a named data input stream, comprising means for examining the content of a fragment file to identify embedded constructs that act as an access of data held by the repository when said constructs are executed by a client; means for identifying the data that is the object of the access; display means by which the content of fragment files is presented to the repository designer with said constructs displayed uniquely from other content; means for permitting the retention, deletion or alteration of said constructs by the repository designer through a user interface; and means for substituting said constructs with a placeholder value;

means for parsing and substituting constructs that are components of fragment files; further including means for accessing a substitution table containing a set of substitution records, said substitution records including one each of a parse phrase, a substitution index and a substitution phrase;

means for examining the content of a fragment file, said parse phrases are used in comparison with the content of the fragment file to identify constructs;

means wherein said substitution index is paired with the object of the construct, said object being a reference to tangible data held by the repository and contained within the syntax of the construct, said pairing used as the placeholder value for the syntax of said construct; and means wherein within said means of identifying placeholders said substitution phrase is used as a replacement for a substitution index and object pair.

10. The system of claim 9, further including means for assigning a specific attribute value to the fragment file if the content of said fragment file contains a construct that indicates that the viewable area of the client display device should be sub-divided into separate areas of information display.

11. In a computer system allowing access to a repository of data wherein access of the repository by a plurality of clients is permitted over a network communications link that may be connected to a server computer that is the custodian of the data repository, comprising in combination:

a source of data that comprises the content of the repository, said data being eligible to be returned to a client as a result of an access made by the client;

means for organizing data into groups of one or more elements through a user interface based on criteria established by the designer of the repository;

means for using said groups individually or in combination in the formation of a response to a client based on the access made by the client;

means for controlling an access that may be executed by a client, said access being included as a component of group content;

means for the selective assignment of a permission value to said group through a user interface, said permission value specifying the access and combination scope of the group to which it is assigned;

means for determining when the intent of an access is to retrieve data held by the repository;

means for determining when an access or sequence of accesses is invalid for the repository;

means for delineating data into groups comprising input means for reading a named sequence of data, said data intended for use as a component of repository content, by separating said data sequence into one or more fragment files, the content and number of resulting said fragment files determined by the repository designer through a user interface; means for associating a fragment file with the data input stream from which it was created, wherein said association causes the enumeration of the fragment file; means for generating a data structure that lists one or more fragment files, said structure specifying the re-assembly order of fragment files, said re-assembly order describing the reconstruction of the data input stream from which the fragment files were created;

means for constructing a response page table that contains a unique entry for each fragment file list, said list to be used as the template for selecting and assembling data held by the repository into a client response as a result of an access made by the client; and means for constructing a reference map table for each said fragment file list contained within the response page table, said reference map table containing an entry for each placeholder found within fragment files means for constructing a reference map table for each said fragment file identified by the list, said entry containing a position field whose value describes the relative offset position of the placeholder to other placeholders within the content of the fragment file, a parse index field whose value is the substitution index of the placeholder and a target field, whose value identifies the data held by the repository, said target field value representing the object of the placeholder.

12. The system of claim 11, further including means for permitting the repository designer through a user interface to assign a permission value to each and any fragment file or response table entry.

13. The system of claim 11, further including means for permitting the repository designer through a user interface to select zero or more alternates, each said alternate being a representation of either of a fragment file or response page table entry, and assign each said alternate as an alternative choice to the original object of a placeholder.

14. The system of claim 11, wherein further including:

means for determining access to said repository comprising a reference field means, a forresta identity field means, a destination field means and a supplementary items field means;

wherein said reference field means identifies the repository;

wherein said forresta identity field means conveys the privilege level and identity of the transmission;

wherein said destination field means identifies the specific data held by said repository that is to be assembled into a transmission for use by the client;

wherein said supplementary items field means contains zero or more values that are required to qualify the specific data being retrieved; and the forresta identity field means is adapted to convey the privilege value and identity of the transmission of which it is a component, further comprising means for creating a forresta map table, each entry in said table containing one symbol whose appearance within said table is unique, and each said symbol being one of the upper-case characters "A" through "Z" inclusive, the lowercase characters "a" through "z" inclusive, and the character representations of the digits "1" through "9" inclusive, wherein one value of the forresta identity is created by selecting at least eight values from the forresta map table.

15. The system of claim 14, wherein the destination field means identifies the data held by the repository, further comprising means for using the identifier of a response table entry as the value of the destination field.

16. In a computer system allowing access to a repository of data wherein access control means includes means for organizing data into groups of one or more elements through a user interface based on criteria established by the designer of the repository including:

means for using said groups individually or in combination in the formation of a response to a client based on the access made by the client;

means for controlling an access that may be executed by a client, said access being included as a component of group content;

means for the selective assignment of a permission value to said group through a user interface, said permission value specifying the access and combination scope of the group to which it is assigned;

means for determining when the intent of an access is to retrieve data held by the repository;

means for determining when an access or sequence of accesses is invalid for the repository;

means for determining access to said repository comprising a reference field means, a forresta field means, a destination field means and a supplementary items field means wherein said reference field means identifies the repository; wherein said forresta field means conveys the privilege level and identity of the access; wherein said destination field means identifies the specific data held by said repository that is to be returned to the client as a result of the access; wherein said supplementary items field means contains zero or more values that are required to qualify the specific data being retrieved;

means wherein the forresta field means is adapted to convey the privilege value and identity of the access of which it is a component, further comprising means for creating a forresta map table, each entry in said table containing one symbol whose appearance within said table is unique, and each said symbol being one of the upper-case characters "A" through "Z" inclusive, the lowercase characters "a" through "z" inclusive, and the character representations of the digits "1" through "9" inclusive, wherein one value of the forresta field is created by selecting at least eight values from the forresta map table;

means for requesting one or more blocks of un-initialized memory from the operating system of the server computer which is the host of the repository, the size of said memory blocks specified by the value of one or more obtained random numbers;

means for using the data bits contained within each said memory block as input to a data field to determine the values that may be stored as individual entries in the forresta map table, proceeding to the next memory block when said data bits of the current block have been exhausted;

means for creating an entry in the forresta map table when the contents of the comparison field equate to an eligible symbol;

means for modifying the contents of the comparison field by bit shifting the contents of the comparison field into discard and supplying new bits from the current memory block in use when the content of the comparison field does not equate to an eligible symbol; and means for increasing the shift count used to modify the comparison field by one each time the contents of said comparison field equate to a symbol already present as an entry in the forresta map table, until such time that the shift count is equal to a value that is more than half of the size of the current memory block in use, then resetting said shift count back to one.

17. The system of claim 16, further including means for creating a forresta value to be used as the value of the forresta identity, further including means for obtaining a random number whose value is the range of indices that reference entries in the forresta map table; using said random number as the index to retrieve the value of the entry found at that location in the forresta map table and by repeating the retrieval until sufficient values have been obtained from the forresta map table to construct a forresta identity of a length determined by the repository designer; and further including means to alter the position values within the forresta map table upon detection of an access violation.

18. The system of claim 16, further including means for the identification of an transmission sent by the client to the repository comprising:

means for allowing a client to send a transmission to the repository, said transmission containing a forresta identity whose value allows acceptance and processing of the transmission by the repository, said transmission containing a forresta identity without an assigned privilege level;

means for then assigning to said forresta identity a privilege level value;

means for creating a session node data structure that maintains information particular to forresta identities supplied by a client, a state table data structure that maintains historical information regarding previous transmissions made by the client, a value that represents the moment in time the repository last received a transmission from the client, a value that represents the level of privilege assigned to transmissions made by the client, said privilege level created by the repository designer through a user interface, a field containing the destination value of the current transmission, and a data structure that identifies the data elements of the repository that are currently eligible to be used in the construction of a transmission to the client;

means for using a forresta identity assigned to a session node as the value of the forresta field contained within a transmission format, said transmission format being a component of data managed by the repository, and means for using a forresta identity, unique from identities contained within transmissions exchanged between the client and the repository, to identify a session node within a table of zero or more session nodes.

19. The system of claim 18, wherein the maintenance of historical information regarding previous transmissions made by the client further comprises:

means for creating and maintaining a destination list, said list having elements appearing in a specific order, said elements each having a value that specifies a recognized transmission format and a position value specifying the relative position of said format within a data stream, said list being updated on demand;

means for creating and maintaining an expected forresta list, said list having elements appearing in a specific order, said elements each having a value that specifies a recognized forresta identity and a position value specifying the relative position of a transmission format within a data stream, said list being updated on demand; and means for comparing the values of the forresta and destination fields of a transmission with the values of either of the destination and expected forresta lists, to determine whether or not said transmission should be inhibited.

20. A data access control method for dynamically constructing a transmission for use by a client, said transmission individualized by including at least one forresta identity within the transmission, said transmission comprised of data elements maintained by a repository and assembled together and delivered to the client as a result of a recognized forresta identity being received by the repository from said client, comprising the steps of:

said repository first recognizing said forresta identity by examining at least one known location within the syntax of the transmission for a value that represents an n-byte character sequence having no conflicting meaning within the coding constructs of a transmission;

creating a session node associated with the transmission containing the recognized forresta identity, said format of the session node indexing at least one forresta identity within the transmission and identifying and validating recognized forresta identities contained within each such transmission, and using the contents of said session node to determine if the forresta value is valid within the context of the transmission in which it was recognized;

extracting destination and supplementary items fields that are independent of the forresta identity from the format of a transmission associated with a recognized forresta identity received by the repository, using said extracted fields to determine what data is eligible to be returned as part of a new transmission created by a construction sequence;

creating a construction sequence that indexes the components and forresta identities used to form a new transmission, and where the values of said sequence result from recognizing and validating forresta identities so received; and processing an entry in a response page table identified by the value of the destination field, said processing including the assemblage of a transmission which includes forresta identities, said transmission composed of fragment files identified by their association with said response page table entry, said transmission suitable for use by the client, said assemblage remaining intact at the repository until received by the client.

21. The method of claim 20, including the further step of selecting alternates in succession until one or none succeeds in the processing of a response page table entry, if the privilege value of the session node, said session node containing a destination field that references said response page table entry, does not equal or exceed the permission value assigned to the original object to which the alternates exist.

22. The method of claim 20, including the further step of interpreting a placeholder contained within a fragment file and deciding from its placement and structure the destination value and forresta identity that may replace the placeholder, said step:

including the use of a jump table, said jump table containing a list of parsing references, each such reference identifying a substitution phrase that is recognized as being the next expected placeholder contained within the fragment file;

each such recognized substitution phrase identifying the reference back to the original parse phrase for which the placeholder was originally substituted; and each such entry in the jump table possessing a permission value, assigned through a user interface, to be used in comparison with the permission value assigned to the forresta identity associated with the current transmission.

23. The method of claim 20, further comprising the steps of:

determining when the processing of a transmission will subdivide the display of the client into multiple viewable areas;

creation of a transmission that exists in multiple parts, each said part wholly contained and wherein at least one part describes the characteristics of one or more of the subdivisions and there exists at least one part for each subdivision that provides the display content of said subdivision;

each of said parts existing temporarily and being destroyed upon being de-referenced or due to a permission violation attributed to the session node to which the parts by way of their forresta identities are associated or due to a transmission containing a forresta identity whose reception was outside a permitted period;

preventing the assemblage of a transmission from any said parts that provide content, said transmission containing a forresta identity possessing a permission higher than that assigned to the part that describes the subdividing;

updating of a session node associated with the forresta identity of a transmission part providing content to said display subdivisions; and conversion of a placeholder contained within any said part, said placeholder representing a new instance of a subdivision, into a transmission format that permits inclusion of a transmission part, said transmission part being void of a forresta identity or destination value and remaining executable by the client.

24. The method of claim 20, further comprising the steps of:

creating and updating a session node list dynamically, said list containing one entry for each session node that has an assigned privilege value;

validating the authenticity of a session node using a value equivalence by comparison test, said values being one each of the repository memory address of the session node and the repository memory address of session nodes stored as entries in the session node list;

further validating the authenticity of a session node using a value equivalence by comparison test, said values being one each of a signature value assigned to a session node by the client and the signature value found attached to a session node by the repository, both said signature values being comprised of a forresta identity, said identity unique from identities contained within transmissions; and examining each session node present on the session node list for a permitted reception of transmission period failure, said failure being tested for at each instance of receipt of any access intended for the repository, and by removing all said nodes that show said failure from the session node list, said list having one entry for each session node.

25. The method of claim 20 further including the steps of:

determining if any client has failed to make a transmission containing one or more forresta identities to said repository within a permitted period by examining the status of all outstanding forresta identities each time any forresta identity is recognized; and examining forresta identities for their use and placement within the current transmission, any said violation of said expected use and placement inhibiting the use of any other transmissions containing a forresta identity between the client and the server.

* * * * *